United States Patent
Taguchi

(10) Patent No.: US 6,665,006 B1
(45) Date of Patent: *Dec. 16, 2003

(54) VIDEO SYSTEM FOR USE WITH VIDEO TELEPHONE AND VIDEO CONFERENCING

(75) Inventor: Tomishige Taguchi, Urawa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/801,367

(22) Filed: Feb. 19, 1997

Related U.S. Application Data

(63) Continuation of application No. 08/307,141, filed on Sep. 16, 1994, now abandoned.

(30) Foreign Application Priority Data

Sep. 20, 1993 (JP) ............................................. 5-232953
Dec. 31, 1993 (JP) ............................................. 5-349608

(51) Int. Cl.⁷ ............................................. H04N 5/232
(52) U.S. Cl. .................. 348/211.1; 348/211.8
(58) Field of Search ............................ 348/13–24, 142, 348/143, 149, 185, 211, 212, 213, 214, 584, 589, 590, 153, 159, 385, 14.01, 14.03, 14.05, 14.07, 14.08, 14.09, 211.1–211.9, 211.11–211.12, 211.13, 211.14, 207.1, 207.11; 358/404, 408, 450, 451, 452, 453; 364/188, 189, 190; H04N 7/14, 7/15

(56) References Cited

U.S. PATENT DOCUMENTS

| | | | |
|---|---|---|---|
| 4,516,156 A | * 5/1985 | Fabris et al. | 348/15 |
| 4,910,604 A | 3/1990 | Takei et al. | 358/310 |
| 5,040,068 A | * 8/1991 | Parulski et al. | 348/376 |
| 5,111,288 A | * 5/1992 | Blackshear | 348/143 |
| 5,138,460 A | * 8/1992 | Egawa | 348/239 |
| 5,155,683 A | 10/1992 | Rahim | 364/424.02 |
| 5,164,980 A | * 11/1992 | Bush et al. | 348/17 |
| 5,206,721 A | * 4/1993 | Ashida et al. | 348/14.1 |
| 5,231,517 A | 7/1993 | Taguchi | 358/453 |
| 5,396,287 A | * 3/1995 | Cho | 348/211 |
| 5,426,732 A | * 6/1995 | Boises et al. | 395/161 |
| 5,444,476 A | * 8/1995 | Conway | 348/15 |
| 5,515,099 A | * 5/1996 | Cortjens et al. | 348/15 |
| 5,793,367 A | 8/1998 | Taguchi | 348/159 |
| 6,433,796 B1 | 8/2002 | Taguchi | 348/11.8 |

FOREIGN PATENT DOCUMENTS

| | | | |
|---|---|---|---|
| EP | 0 400 668 | 12/1990 | H04N/7/15 |
| EP | 0523617 | * 1/1993 | H04N/7/14 |
| EP | 0539695 | * 5/1993 | H04N/7/14 |
| JP | 04302587 | 10/1992 | H04N/5/222 |

OTHER PUBLICATIONS

Robinson et al.; A Multimedia Interactive Conferenceing Application for Personal Workstations; IEEE Trans. on Communications, vol. 39, No. 11, pp. 1698–1708, Nov. 1991.*

* cited by examiner

Primary Examiner—Aung S. Moe
(74) Attorney, Agent, or Firm—Fitzpatrick, Cella, Harper & Scinto

(57) ABSTRACT

This invention provides a video system including an image pickup device for converting an optical image into a video signal, an image pickup direction changing device for changing the image pickup direction of the image pickup device, an image display device for displaying the video signal output from the image pickup device, and a function display device for displaying function information of the image pickup device.

51 Claims, 43 Drawing Sheets

FIG. 8

| | APPARATUS TO BE CONTROLLED | KINDS OF OPERATION COMMANDS | | |
|---|---|---|---|---|

APPARATUS TO BE CONTROLLED : V11--VIDEO CAMERA 13a
V12--VIDEO CAMERA 13b

OPERATION COMMANDS

:F0--FOCUS MODE AUTO SETTING
F1--FOCUS MANUAL SETTING
F2--FOCUS POSITION LONG DISTANCE SETTING
F3--FOCUS NEAR DISTANCE SETTING
E0--IRIS MODE AUTO SETTING
E1--IRIS MANUAL SETTING
E2--IRIS LIGHT AMOUNT REDUCING MODE SETTING
E3--IRIS LIGHT AMOUNT INCREASING MODE SETTING
E5--IRIS LIGHT AMOUNT ABSOLUTE VALUE DESIGNATION
(USE EXTENSION)

I0--INITIALIZATION REQUEST
T0--STATUS SIGNAL RETURN REQUEST
T1--FUNCTION INFORMATION REQUEST COMMAND

Z0--ZOOM-UP SETTING
Z1--ZOOM-OUT SETTING
Z2--SETTING OF ZOOM MOVEMENT TO STORED POSITION
(USE EXTENSION)
Z5--ZOOM ABSOLUTE POSITION MOVEMENT
(USE EXTENSION)

U0--TRIPOD PAN CLOCKWISE ROTATION SETTING
U1--TRIPOD PAN COUNTERCLOCKWISE ROTATION SETTING
U2--TRIPOD TILT UPPER DIRECTION SETTING
U3--TRIPOD TILT LOWER DIRECTION SETTING
U4--DIRECT MOVEMENT TO STORED POSITION (USE EXTENSION)
U5--TRIPOD PAN DIRECTION ABSOLUTE ANGLE DESIGNATION
(USE EXTENSION)
U6--TRIPOD TILT DIRECTION ABSOLUTE ANGLE DESIGNATION
(USE EXTENSION)

FIG. 9

| CAMERA APPARATUS NUMBER | KINDS OF INFORMATION CA | STATUS CODE |
|---|---|---|

M0: OPERATION FINISHED
M1: NOW OPERATING

FIG. 10

| CAMERA APPARATUS NUMBER | KINDS OF INFORMATION CA | SENSOR SIZE | HORIZONTAL MOVING RANGE ANGLE | VERTICAL MOVING RANGE ANGLE | VIDEO SIGNAL FORM |
|---|---|---|---|---|---|

FIG. 48

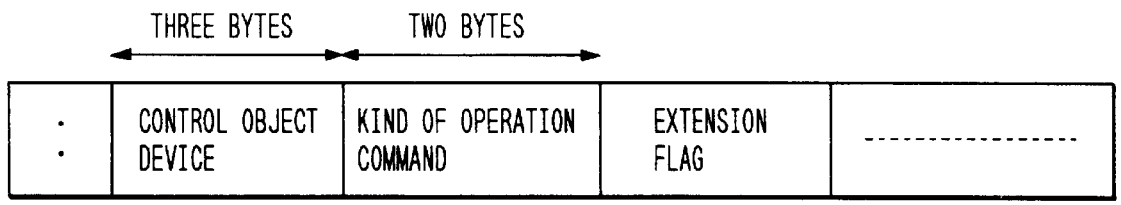

| | CONTROL OBJECT DEVICE | KIND OF OPERATION COMMAND | EXTENSION FLAG | |
|---|---|---|---|---|

THREE BYTES — CONTROL OBJECT DEVICE / KIND OF OPERATION COMMAND
TWO BYTES — EXTENSION FLAG

CONTROL OBJECT DEVICE: V21 ---- FOR CAMERA INPUT 1
                      V22 ---- FOR CAMERA INPUT 2

OPERATION COMMAND: F0 ----- FOCUS MODE AUTO SETTING
                   F1 ----- FOCUS MANUAL SETTING
                   F2 ----- FOCUS POSITION LONG DISTANCE SETTING
                   F3 ----- FOCUS NEAR DISTANCE SETTING
                   E0 ----- IRIS MODE AUTO SETTING
                   E1 ----- IRIS MANUAL SETTING
                   E2 ----- IRIS LIGHT AMOUNT REDUCING MODE SETTING
                   E3 ----- IRIS LIGHT AMOUNT INCREASING MODE SETTING
                   T0 ----- STATUS SIGNAL RETURN REQUEST

Z0 ----- ZOOM-UP SETTING
                   Z1 ----- ZOOM-OUT SETTING
                   Z2 ----- SETTING OF ZOOM MOVEMENT TO STORED POSITION (USE EXTENSION)
                   U0 ----- TRIPOD PAN CLOCKWISE ROTATION SETTING
                   U1 ----- TRIPOD PAN COUNTERCLOCKWISE ROTATION SETTING
                   U2 ----- TRIPOD TILT UPPER DIRECTION SETTING
                   U3 ----- TRIPOD TILT LOWER DIRECTION SETTING

U7 ----- ENTIRE PHOTOGRAPHING PICTURE PLANE DISPLAY COMMAND
                   U8 ----- PHOTOGRAPHING PROHIBITION SETTING COMMAND
                   U9 ----- MOVE-TO-LEFT COMMAND
                   U10 ----- MOVE-TO-RIGHT COMMAND
                   U11 ----- MOVE-UP COMMAND
                   U12 ----- MOVE-DOWN COMMAND

VIDEO SYSTEM FOR USE WITH VIDEO TELEPHONE AND VIDEO CONFERENCING

This application is a continuation of application Ser. No. 08/307,141, filed Sep. 16, 1994, now abandoned.

BACKGROUND OF THE INVENTION

1. Field of the Invention

The present invention relates to a video system for video telephones and video conferences using video cameras and the like.

2. Description of the Related Art

In recent years, along with the development of microprocessors which can realize high-speed arithmetic operations, personal computers, workstations, and the like for multimedia information can process a large volume of image information and audio information in real time. More specifically, personal computers and workstations can realize a device for reading out a full-color moving image signal, an audio signal, and the like from a CD-ROM, and reproducing these signals in association with each other, and a video conference or video telephone function of achieving a conference such as a meeting by converting a moving image signal and an audio signal from a video camera into digital signals, and transmitting compressed digital signals to a remote station via a communication line.

In the video telephone or video conference function utilizing a personal computer or workstation, a video camera is arranged on or near a monitor. Recently, a system which can control the video camera in accordance with commands from the personal computer or workstation by a simple operation has been developed.

However, when the video telephone or video conference function is realized using a combination of a personal computer or workstation with a video camera, different device driver software programs must be prepared and selectively used in correspondence with the sensor sizes and functions of video cameras, resulting in inconvenience for an operator. In order to detect a photographing range in direction or zoom control of the camera, the range must be confirmed by operating the camera to the limit of the direction or zoom control, and a cumbersome operation is required for displaying a required image on a monitor, resulting in poor operability. Furthermore, in the video conference or video telephone function, since the direction and zooming of the camera can be controlled by the remote station side, an image including contents which are not to be disclosed to a third party is undesirably transmitted to the remote station, thus posing a problem associated with protection of privacy.

SUMMARY OF THE INVENTION

It is an object of the present invention to provide a video system which can solve the above-mentioned problems, and is easy to use.

It is another object of the present invention to provide a video system with high operability.

It is still another object of the present invention to provide a video system which can obtain a required image.

In order to achieve the above objects, according to one aspect of the present invention, an optical image is converted into a video signal by an image pickup means, the image pickup direction of the image pickup means is changed by an image pickup direction changing means, the video signal output from the image pickup means is displayed on an image display means, and function information of the image pickup means is displayed on a function information display means. With this arrangement, the image pickup direction of the image pickup means can be freely changed by the receiving station side, and a video system which is very easy to use can be provided. Since the function information of the image pickup means is displayed, an operator can recognize functions at a glance, and need not operate the image pickup means to confirm the functions.

According to another aspect of the present invention, an optical image is converted into a video signal by an image pickup means, the image pickup direction of the image pickup means is changed by an image pickup direction changing means, the video signal output from the image pickup means is stored as a still image in a still image storage means, the image pickup direction of the image pickup means upon photographing of the still image is stored in a photographing direction storage means, the still image stored in the still image storage means is displayed on a still image display means, a moving image output from the image pickup means is displayed on a moving image display means, the position on the still image displayed on the still image display means is designated by a designation means, and the photographing direction change means is controlled, so that the position designated by the designation means becomes a predetermined position of an image. With this arrangement, the image pickup direction of the image pickup means can be freely changed by the receiving station side, and control is made, so that the designated position on the stored still image becomes a predetermined position of an image. For this reason, a video system which is convenient and allows for simple operation can be provided.

According to still another aspect of the present invention, an optical image is converted into a video signal by an image pickup means, the image pickup direction of the image pickup means is changed by an image pickup direction changing means, a video signal within a photographable range of the image pickup direction changing means is stored, and the stored video signal is displayed. With this arrangement, the image pickup direction can be freely changed by the receiving station side, and an image within the stored photographable range is displayed. For this reason, since an operator can know the photographable range at a glance, a very efficient video system can be provided.

Other objects and features of the present invention will become apparent from the following specification and the accompanying drawings.

BRIEF DESCRIPTION OF THE DRAWINGS

FIG. 8 is a table showing control commands for controlling various operations;

FIG. 9 is a table showing the status format of the video camera;

FIG. 10 is a table showing the function information format of the video camera;

FIG. 48 is a table showing the transmission format of camera control commands.

DESCRIPTION OF THE PREFERRED EMBODIMENTS

The preferred embodiments of the present invention will be described in detail below with reference to the accompanying drawings.

Figure 1:
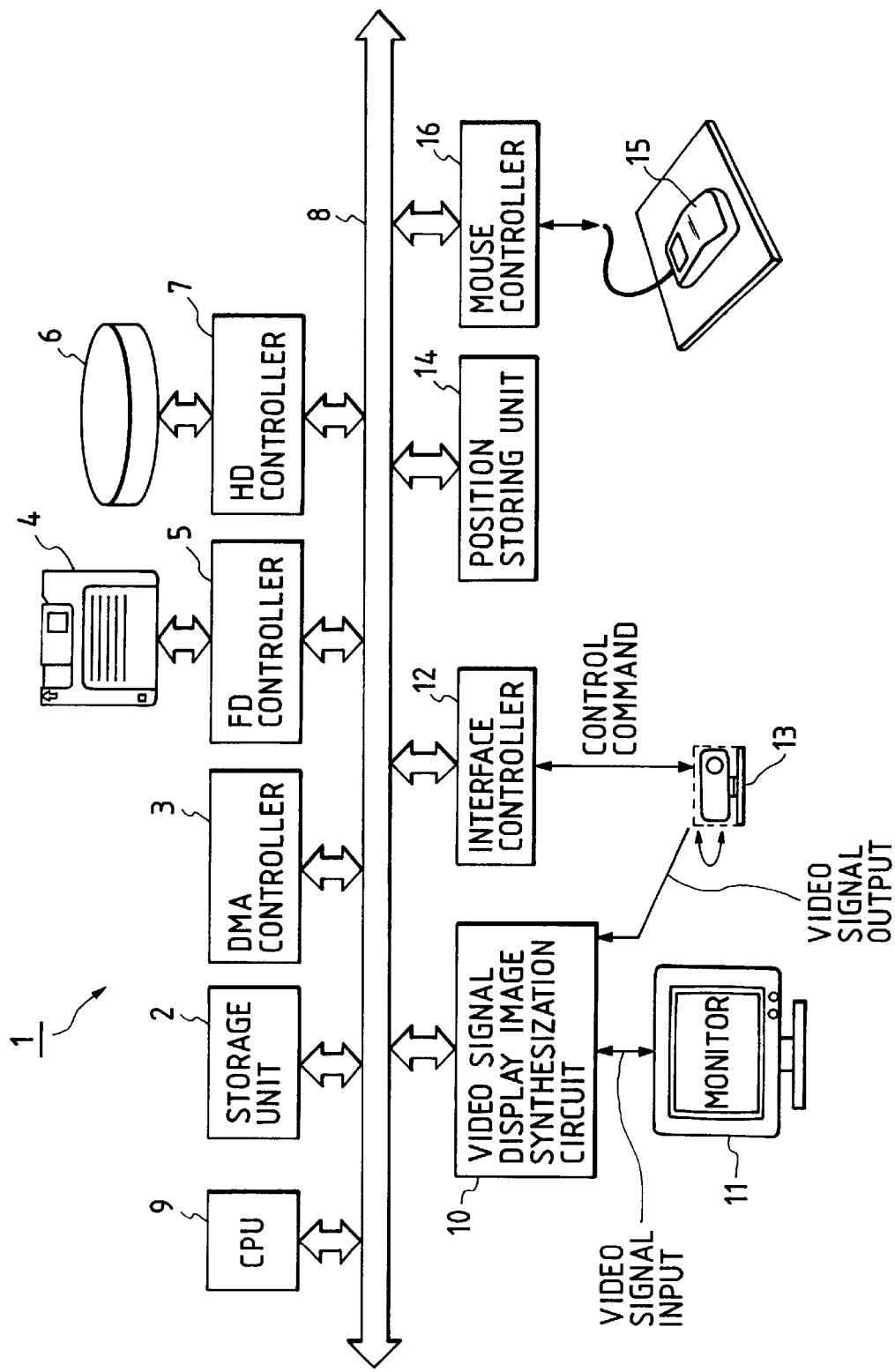
FIG. 1 is a block diagram showing the arrangement of the entire control apparatus for an image input device according to the first embodiment of the present invention.

FIG. 1 is a block diagram showing the first embodiment of a control apparatus for a video camera which is applied to a video system according to the present invention. The a control apparatus 1 has the following arrangement. That is, a storage unit 2 which comprises a ROM for storing a control program and the like and a RAM for temporarily storing various data during a control operation, a DMA (Direct Memory Access) controller 3, an FD controller 5 for controlling a flexible disk 4, and an HD controller 7 for controlling a hard disk 6 are connected to a CPU (central processing unit) 9 via an address/data bus 8 (to be referred to as a "bus" hereinafter). The CPU 9 is connected to a video signal display image synthesization circuit 10 (to be referred to as an "image synthesization circuit" hereinafter) via the bus 8, and the image synthesization circuit 10 is connected to a monitor 11 and a plurality of video cameras 13. More specifically, the image synthesization circuit 10 performs predetermined display processing on the basis of a video signal from each video camera 13, and outputs the video signal to the monitor 11. Furthermore, the CPU 9 is connected to an interface controller 12 via the bus 8, and the interface controller 12 is connected to the plurality of video cameras 13. These video cameras 13 and the interface controller 12 can perform bidirectional transmission/reception of control commands therebetween. More specifically, the interface controller 12 generates a transmission request signal for requesting transmission of, e.g., function information of each video camera 13. On the other hand, the video cameras 13 transmit control commands such as function information to the interface controller 12 in response to the transmission request signal, and supply predetermined video signals to the image synthesization circuit 10. The CPU 9 is connected to a position storing unit 14 and a mouse controller 16 via the bus 8. The position storing unit 14 stores position information of each video camera 13 corresponding to an image displayed on the monitor 11. The mouse controller 16 is connected to a pointing device such as a mouse 15, and controls its operation.

Figure 2:
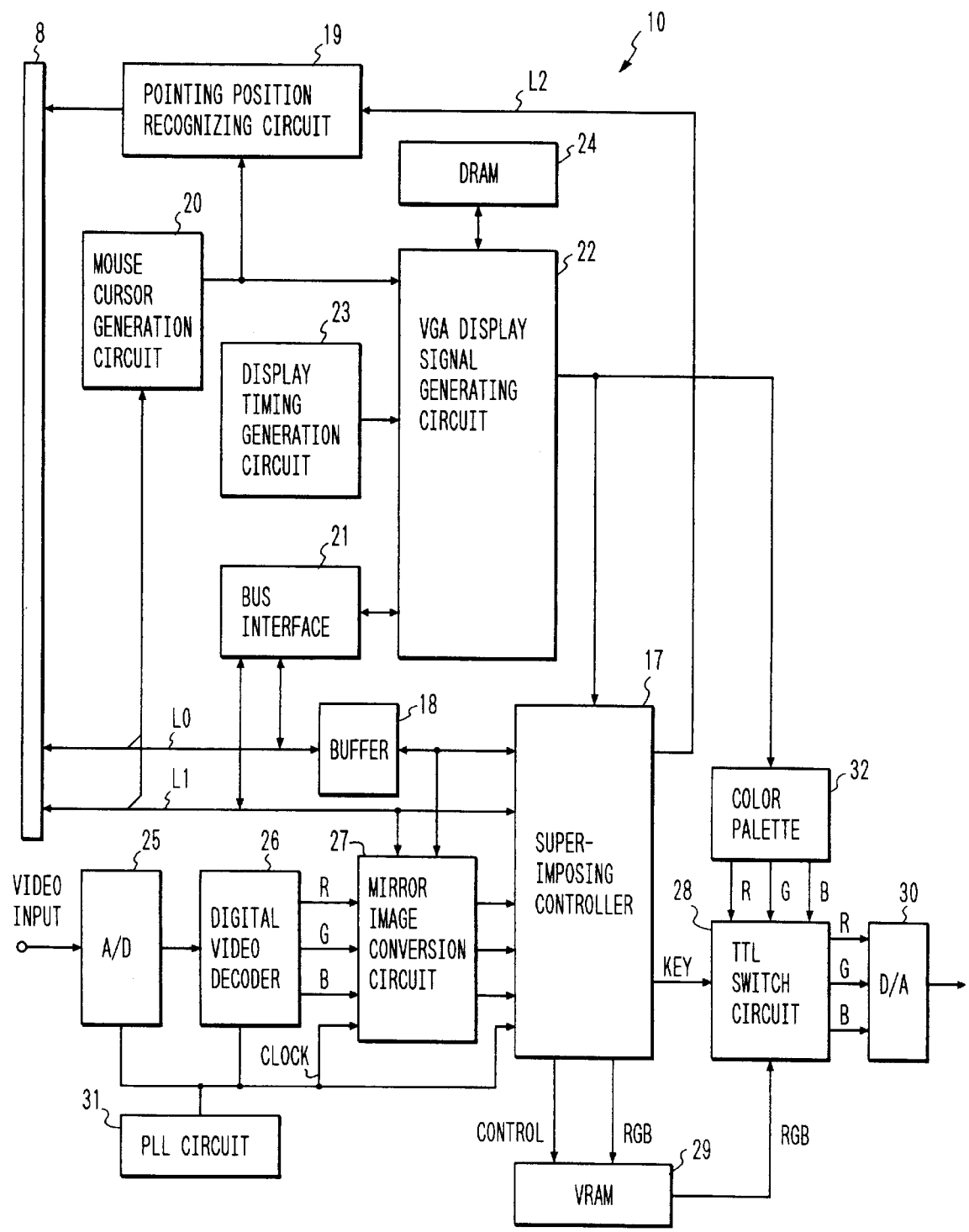
FIG. 2 is a block diagram showing the arrangement of an image synthesization circuit.

The image synthesization circuit 10 has an arrangement, as shown in detail in FIG. 2. A superimposing controller 17 is connected to the bus 8 via a data signal line L0, a control signal line L1, and a position information line L2 to execute an image synthesization operation. The data signal line L0 is connected to a buffer 18, and the position information line L2 is connected to a pointing position recognizing circuit 19 for recognizing the pointing position on a picture or screen.

The data signal line L0 and the control signal line L1 are connected to a mouse cursor generation circuit 20 for generating a mouse cursor, and a bus interface 21 for performing an interface operation with the bus 8. Furthermore, the mouse cursor generation circuit 20 and the bus interface 21 are connected to a VGA (Video Graphics Array) display signal generating circuit 22 for outputting a VGA display signal, and the VGA display signal generating circuit 22 is connected to a display timing generation circuit 23 for setting a display timing, a DRAM (dynamic random access memory) 24, the pointing position recognizing circuit 19, and the superimposing controller 17.

On the other hand, an A/D converter 25 which receives a video signal from each video camera 13 is connected to a digital video decoder 26 for decoding the video signal. The digital video decoder 26 is connected to a mirror image conversion circuit 27 for performing mirror image conversion. The mirror image conversion circuit 27 horizontally reverses a video signal, and displays an image on the monitor 11 as if the image were reflected in a mirror. More specifically, the mirror image conversion circuit 27 writes an input video signal for one line in, e.g., a line memory in the input order, and reads out the information written one line before in the reverse direction at the timing of the next line. Then, a current input signal is written at the readout address, thus achieving full-line mirror image reversal.

The mirror image conversion circuit 27 is connected to the superimposing controller 17. The superimposing controller 17 is connected to a TTL (Transistor Transistor Logic) switch circuit 28, which performs logic processing of a signal, directly or via a VRAM (video random access memory) 29. Furthermore, the TTL switch circuit 28 is connected to a D/A converter 30.

The A/D converter 25, the digital video decoder 26, the mirror image conversion circuit 27, and the superimposing controller 17 are connected to a PLL (Phase-locked loop) circuit 31, and the VGA display signal generating circuit 22 is connected to the TTL switch circuit 28 via a color palette 32.

In the image synthesization circuit 10, an analog video signal input from each video camera 13 is converted into a digital signal via the A/D converter 25, and the digital signal is decoded by the digital video decoder 26, thus generating RGB (Red, Green, and Blue) signals. The RGB video signals are input to the mirror image conversion circuit 27 and are subjected to mirror image conversion. Thereafter, the RGB signals are input to the superimposing controller 17. Then, the RGB video signals are temporarily stored in the VRAM 29, and are read out in synchronism with the VGA display signal generating circuit 22. The readout RGB signals are synthesized with a VGA signal by the TTL switch circuit 28, and the synthesized composite signals are converted by the D/A converter 30 into an analog signal. The converted analog signal is output to the monitor 11 as a video signal. More specifically, the VRAM 29 constantly stores input video signals, and the video signals are read out asynchronously with the storage operation but synchronously with the VGA display signal generating circuit 22.

Figure 3:
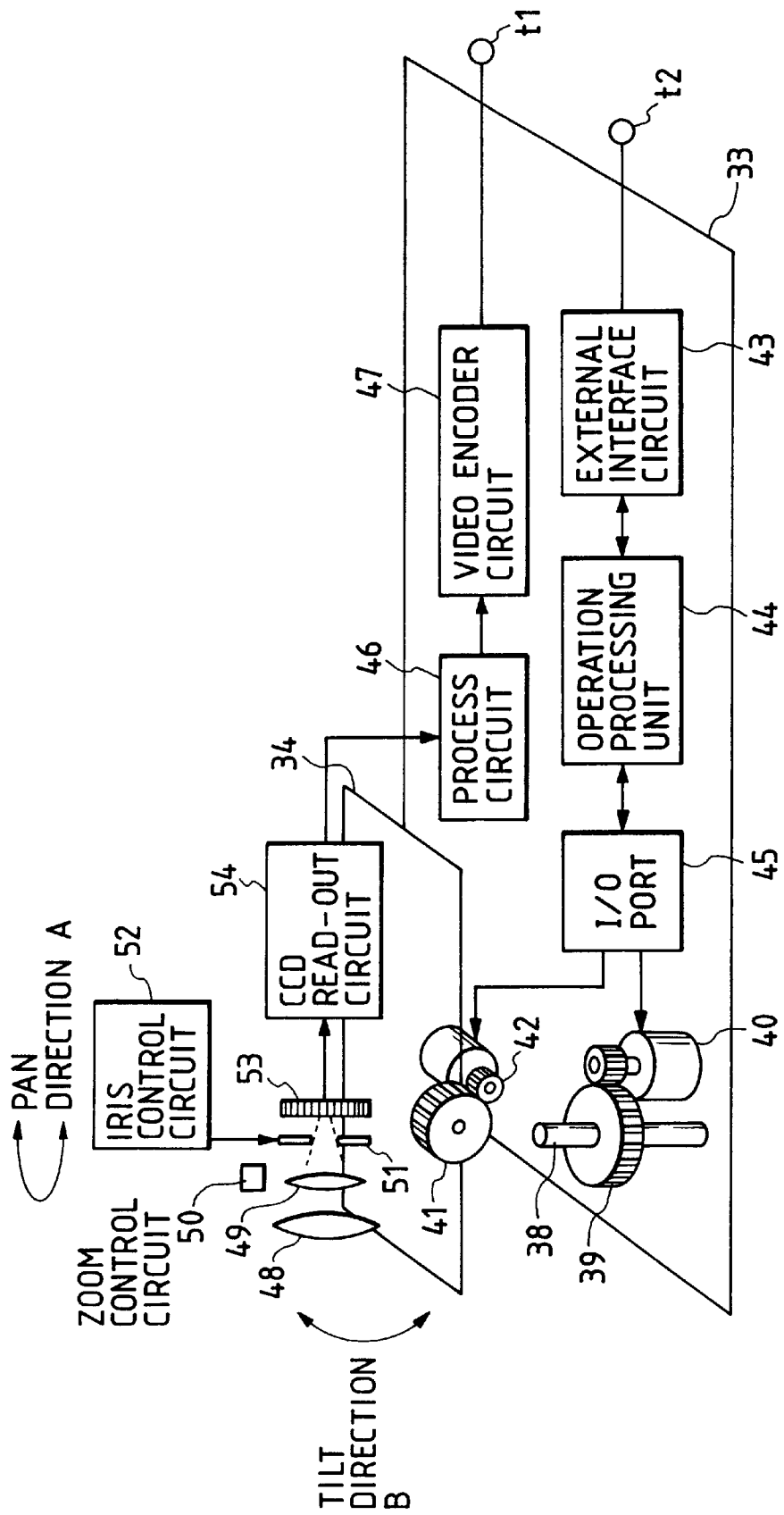
FIG. 3 is a schematic diagram showing the arrangement of a video camera.

FIG. 3 is a schematic diagram showing a drive device and circuit for each video camera 13. Each video camera 13 comprises a stationary portion 33 and a movable portion 34. The movable portion 34 is attached to the stationary portion 33 to be movable in the pan and tilt directions.

More specifically, the stationary portion 33 incorporates a drive device for rotating the video camera 13 in the pan and tilt directions, a control circuit for controlling the drive device, and a video circuit for outputting a video signal.

The drive device comprises, as major components, a pan cogwheel 39 for rotating the movable portion 34 in the pan direction (indicated by an arrow A in FIG. 3) via a pan shaft 38, a pan control motor 40 for transmitting the drive force to the pan cogwheel 39, a tilt cogwheel 41 for rotating the movable portion 34 in the tilt direction (indicated by an arrow B in FIG. 3) via a tilt shaft (not shown), and a tilt control motor 42 for transmitting the drive force to the tilt cogwheel 41.

The control circuit comprises an external interface circuit 43 for performing an interface operation with the control apparatus, an operation processing unit 44, and an input/output (I/O) port 45 for supplying control signals to the pan control motor 40 and the tilt control motor 42 in accordance with the operation result of the operation processing unit 44.

Furthermore, the video circuit comprises a process circuit 46 for, e.g., separating an output signal from the movable portion 34 into a luminance signal Y and a chrominance signal C, and a video encoder circuit 47 for outputting a predetermined video signal.

On the other hand, the movable portion 34 comprises a lens 48, a zoom lens 49, a zoom control circuit 50 for controlling the zoom lens 49, an iris 51, an iris control circuit 52 for controlling the iris 51, a CCD 53 for converting an optical image of an object into an electrical signal, and a CCD read-out circuit 54 for reading out an electrical signal converted by the CCD 53 and transmitting the readout signal to the process circuit 46.

In the video camera, the zoom position is set by the zoom control circuit 50 and the iris is set by the iris control circuit 52. An optical image of an object is formed on the CCD 53 via the lens 48 and the zoom lens 49, and is photoelectrically converted into a video signal. The video signal is output from a video terminal t1 via the process circuit 46 and the video encoder circuit 47. Also, a control signal is input from a control terminal t2 to the pan control motor 40 and the tilt control motor 42 via the external interface circuit 43, the operation processing unit 44, and the I/O port 45 so as to attain rotation control in the pan and tilt directions.

Figure 4:
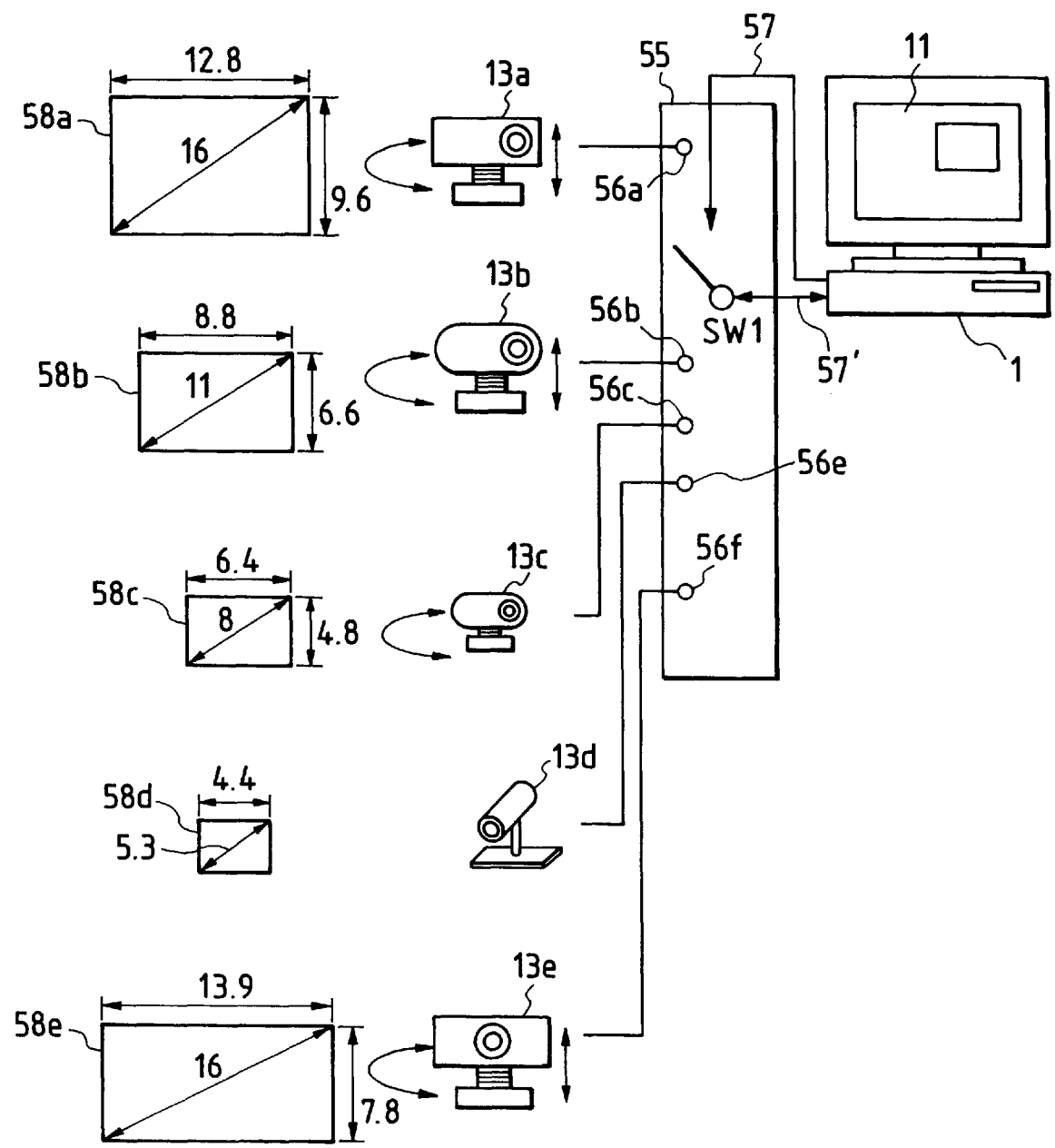
FIG. 4 is a diagram showing a state wherein video cameras are connected to the control apparatus.

FIG. 4 shows a state wherein various video cameras 13a to 13e to be controlled are connected to the control apparatus 1. In FIG. 4, various video cameras 13a to 13e having different sensor sizes and operation functions are connected to the control apparatus 1 via a switch 55. More specifically, the switch 55 has terminals 56a to 56e, and one of the terminals 56a to 56e is selected by a switching control signal 57 from the control apparatus 1. One of the video cameras 13a to 13e connected to the selected terminal exchanges signals with the control apparatus 1 via a signal line 57'.

More specifically, the terminal 56a is connected to a video camera 13a which comprises a 1" CCD sensor as an image pickup unit 58a, and has pan and tilt functions, and the terminal 56b is connected to a video camera 13b which comprises a ⅔" CCD sensor as an image pickup unit 58b and has pan and tilt functions. The terminal 56c is connected to a video camera 13c which comprises a ½" CCD sensor as an image pickup unit 58c and has only a pan function, and the terminal 56d is connected to a head-separated fixed camera 13d which comprises a ⅓" CCD sensor as an image pickup unit 58d. Furthermore, the terminal 56e is connected to a hi-vision video camera 13e which comprises a 1" CCD sensor as an image pickup unit 58e. Note that the present invention is not limited to the above-mentioned video cameras 13 connected to the terminals 56a to 56e, and video cameras 13 having arbitrary sensor sizes can be connected to these terminals.

Figure 5:
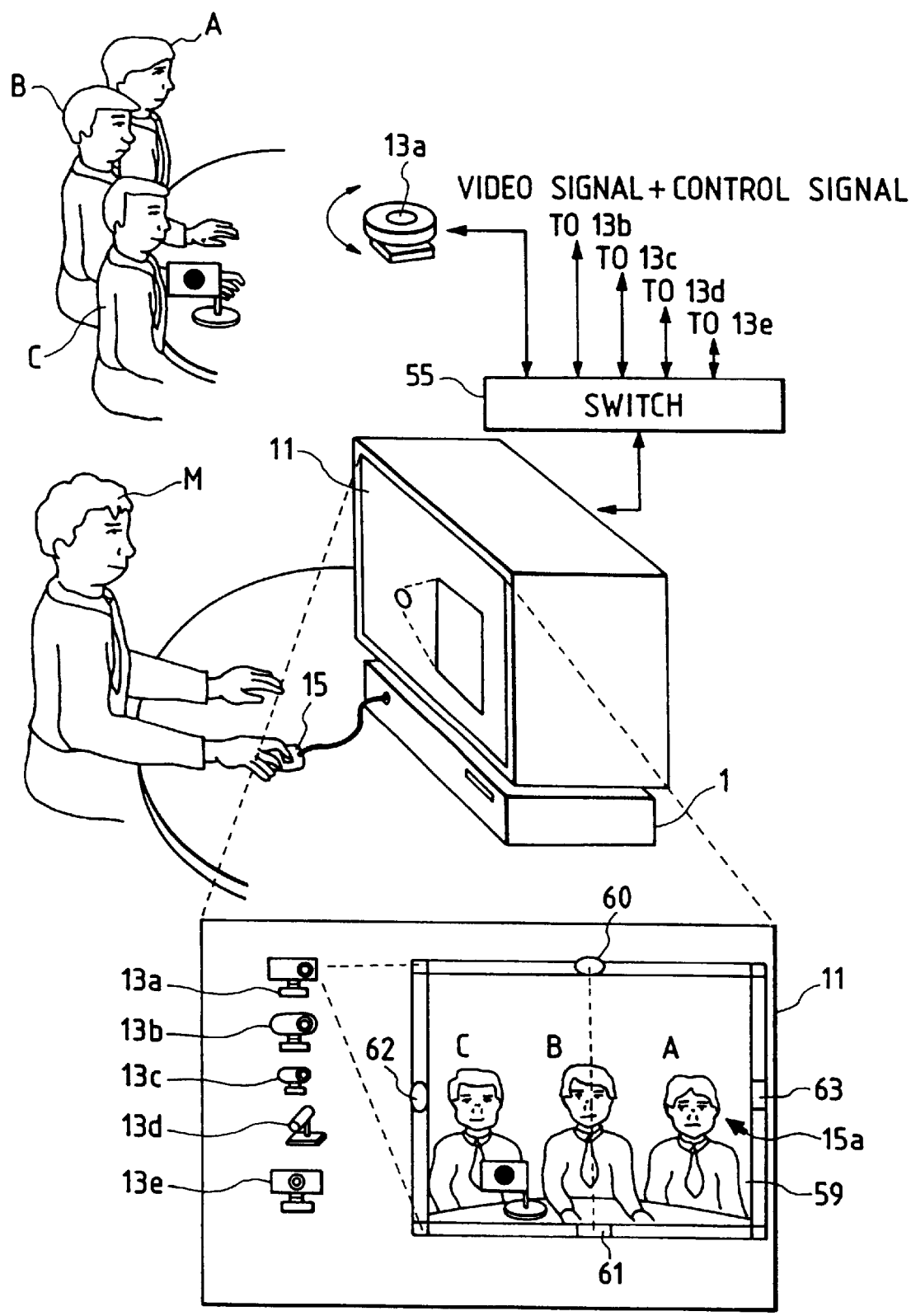
FIG. 5 is a view showing a state wherein images of objects are picked up by the video camera and are displayed on a monitor.

FIG. 5 shows a state wherein object persons A, B, and C are photographed by the video camera 13a, and their images are displayed on a display picture 59. An iris control cursor 60, a pan control cursor 61, a zoom control cursor 62, and a tilt control cursor 63 are respectively arranged at the upper, lower, left, and right positions on the display picture 59. By designating the iris control cursor 60, the iris control circuit 52 is driven to control the brightness on the display picture 59. When an auto iris mode is set, iris data included in status information from the video camera 13 is received to control the iris control cursor 60. On the other hand, by designating the zoom control cursor 62, the zoom lens 49 is moved via the zoom control circuit 50. An operator M operates the mouse 15 while observing the monitor 11 to perform display control of object persons on the display picture 59. Note that a mouse cursor 15a is generated by the mouse cursor generation circuit 20 upon operation of the mouse 15.

In FIG. 5, the video camera 13a is operated to display the object person B at the central position of the display picture 59 at the present time. For example, the video camera 13a can be remote-controlled to display the object person A at the central position of the display picture.

The control method will be described below with reference to FIGS. 6A to 7.

Figure 6A:
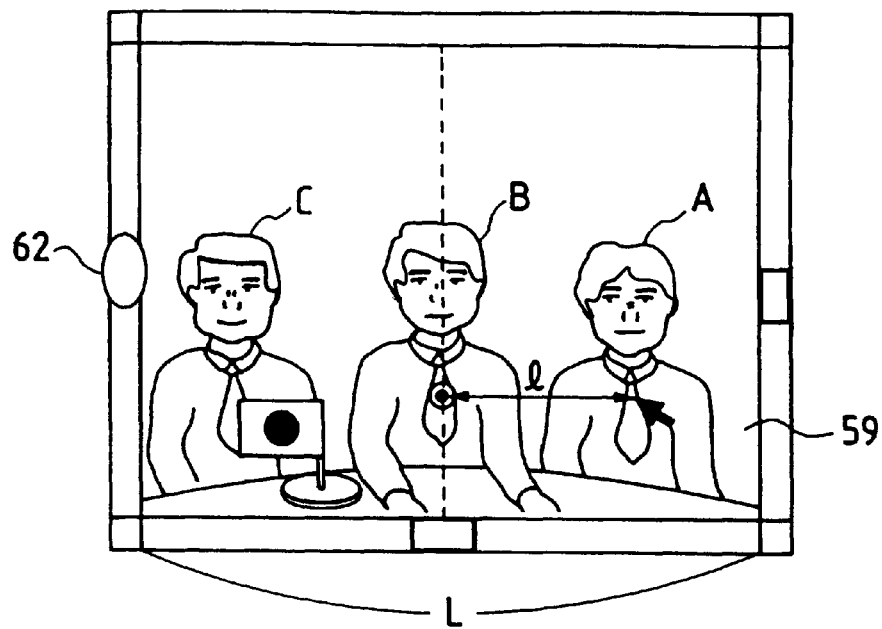
FIGS. 6A and 6B are views showing the positional relationship between moving, images on a display picture and objects.
Figure 6B:
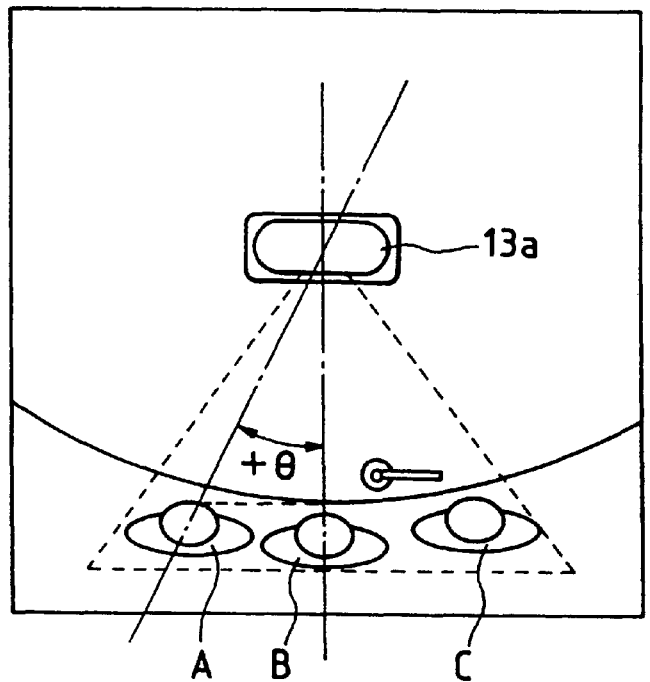
Figure 7:
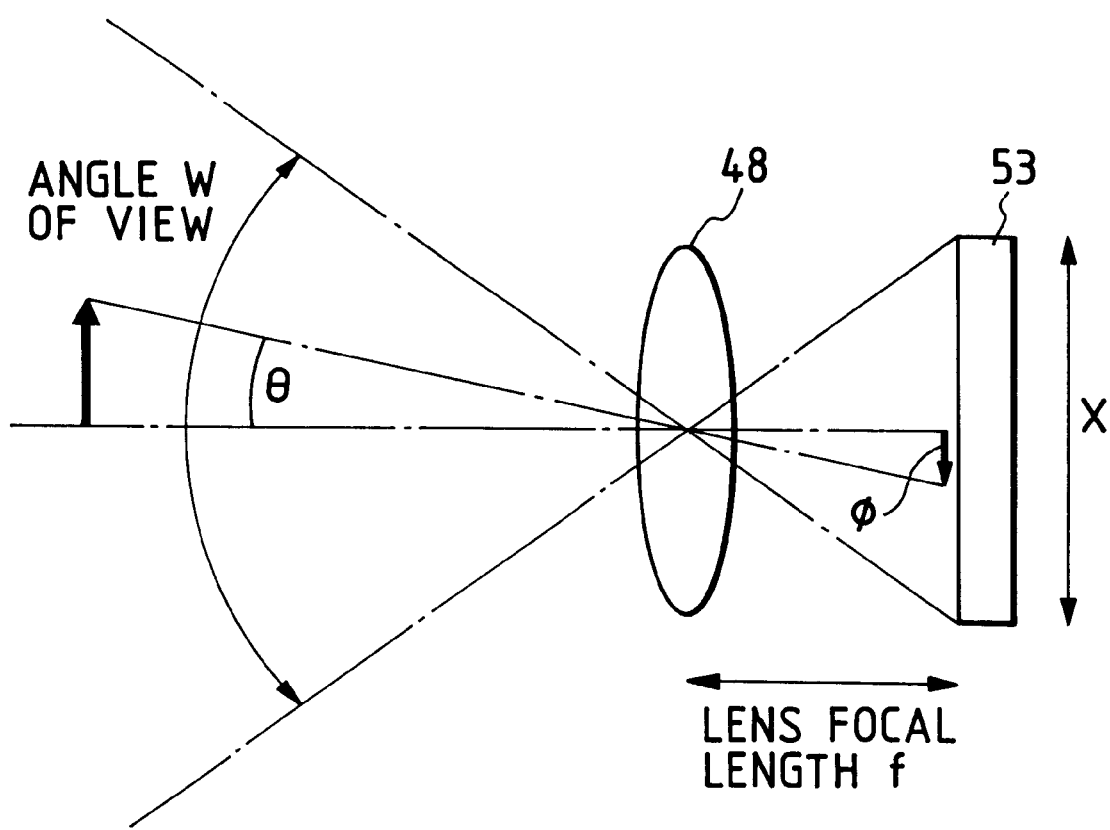
FIG. 7 is a view showing the relationship between the focal length of a lens and the photographable angle of view of a CCD.
Figure 11:
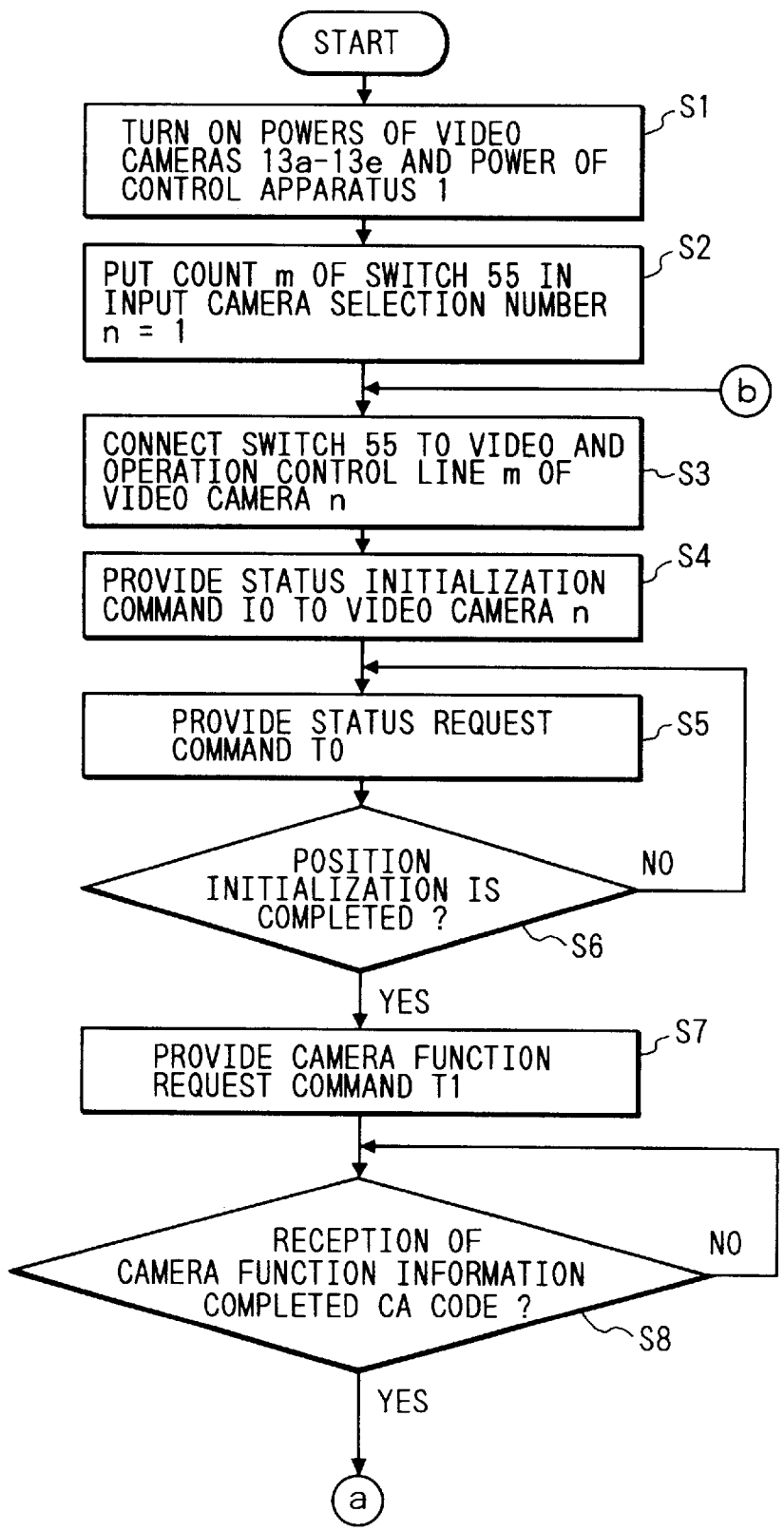
FIG. 11 is a flow chart showing the control sequence of the first embodiment.
Figure 12:
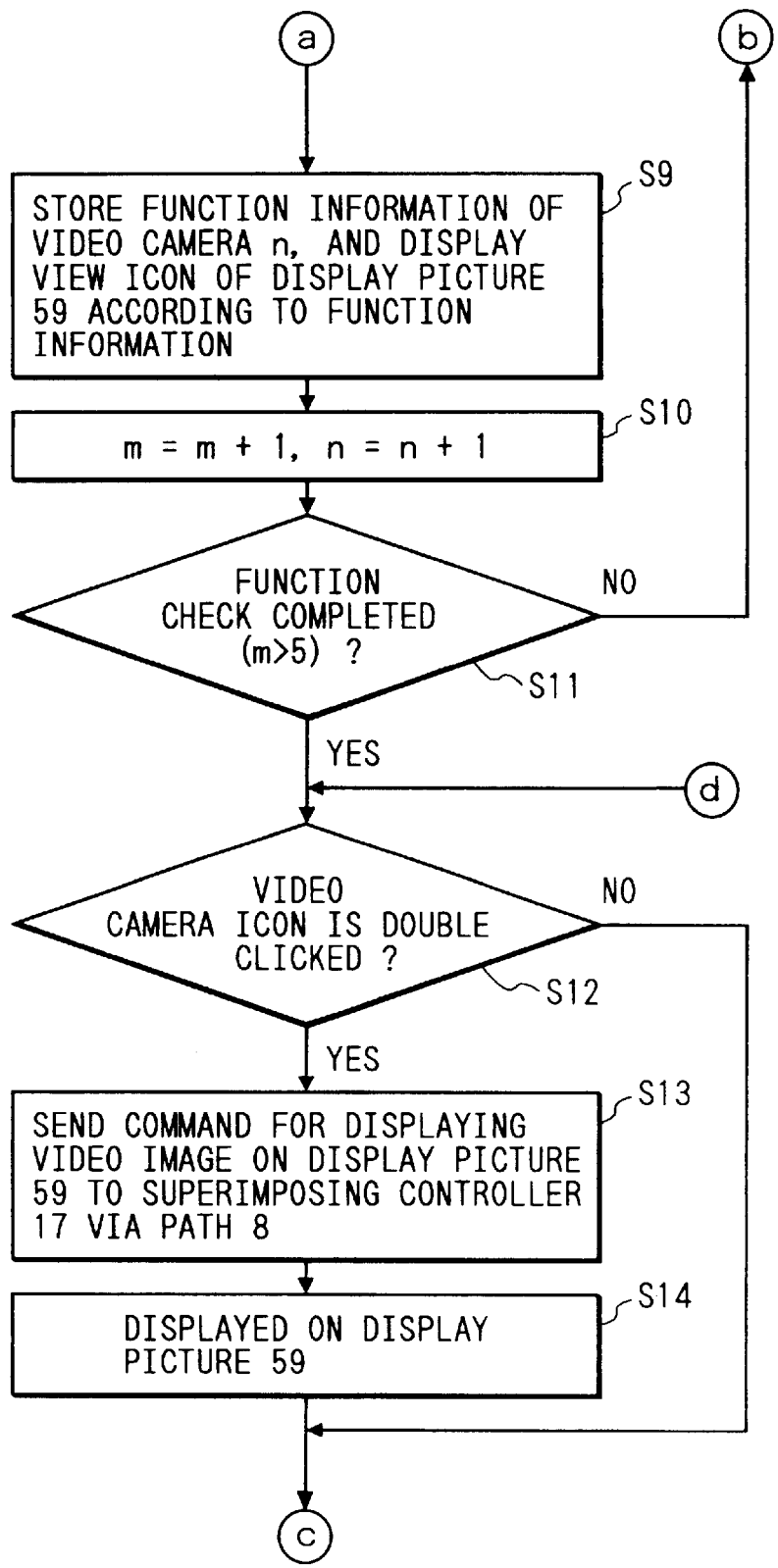
FIG. 12 is a flow chart showing the control sequence of the first embodiment.

FIG. 6A shows object persons displayed on the display picture 59 of the monitor 11. In FIG. 6A, the distance between the object persons A and B on the display picture 59 is l, and the horizontal distance of the display picture 59 is L. FIG. 6B is a plan view of a photographing room. In FIG. 6B, the moving angle of the video camera 13a required for displaying the object person A at the central position of the display picture 59 is θ. FIG. 7 shows the relationship between a focal length f of the lens 48 and a photographable angle W of view of the CCD 53. Referring to FIG. 7, if the horizontal effective distance of the CCD 53 is represented by X, a distance φ between the object persons A and B on the CCD 53, the moving angle φ of the video camera 13a, and the angle W of view are respectively given by the following equations (1) to (3):

$$\phi = X \cdot 1/L \quad (1)$$

$$\theta = \tan^{-1} \phi \quad (2)$$

$$W = 2 \tan^{-1}(X/2f) \quad (3)$$

As can be understood from equation (1), the horizontal effective distance X of the CCD 53 is required for calculating the moving angle θ in the pan direction, and similarly, a vertical effective distance Y (not shown) of the CCD 53 is required for calculating the moving angle in the tilt direction.

Therefore, when an operator operates to sequentially switch the plurality of video cameras 13a to 13e having CCDs 53 of different sizes and to direct one of the video cameras 13 in the target object direction, by grasping the horizontal effective distances X and the vertical effective distances Y of the CCDs 53 used in the video cameras 13a to 13e, the control apparatus 1 can generate drive commands to the pan control motor 40 and the tilt control motor 42 to set a moving angle θ suited for one of the video cameras 13a to 13e as an apparatus to be controlled. Therefore, the operator M can easily perform operation regardless of the types of the video cameras 13a to 13e.

The distance l on the display picture 59 and the horizontal distance L of the display picture 59 are read out from the superimposing controller 17 and the pointing position recognizing circuit 19 via the bus 8 in correspondence with the display storage amount of the VGA display signal generation circuit 22 (see FIG. 2), and are used by the CPU 9 of the control apparatus 1 to calculate equation (2).

FIG. 8 is a table showing a control command system which is generated by the control apparatus 1 to each video camera 13. The table has addresses associated with apparatuses to be controlled (the video cameras 13a to 13e) and the kinds of operation commands (focus setting, iris setting, zoom setting, rotational direction setting, and the like), and each control command is transmitted from the interface controller 12 to each video camera 13. Note that control commands associated with pan and tilt movements are controlled by utilizing $U_X$ (X=0 to 6), as can be seen from operation commands shown in FIG. 8.

FIG. 9 is a table showing the status format of each video camera 13. In a status code, one of M0 indicating "operation finished" and M1 indicating "now operating" is stored. Status information from each video camera is sequentially transmitted from the external interface circuit 43 of each video camera 13 to the interface controller 12 of the control apparatus 1 in the order of a camera apparatus number, information kind code (CA), and status code.

FIG. 10 is a table showing the function format of each video camera 13. Function information from each video camera 13 is sequentially transmitted from its external interface circuit 43 to the interface controller 12 of the control apparatus 1 in the order of a camera apparatus number, information kind code (CA), sensor size, horizontal moving range angle, vertical moving range angle, and video signal form, and the moving angle θ of the video camera 13 is calculated on the basis of equations (1) to (3) above.

The control sequence of the control apparatus of this embodiment will be described in detail below with reference to the flow charts in FIGS. 11 to 13 and FIG. 4.

The power switches of the video cameras 13a to 13e and the control apparatus 1 are turned on to start a control software program (step S1). A counter m of the switch 55 is set to be 1, and a selection number n of the input video camera is set to be 1 (step S2). When the counter m of the switch 55 is set to be "1", the terminal 56a serves as a video and operation control line; when the counter m of the switch 55 is set to be "2", the terminal 56b serves as a video and operation control line; when the counter m of the switch 55 is set to be "3", the terminal 56c serves as a video and operation control line; and the same applies to other terminals. On the other hand, when the selection number n of the video camera is set to be "1", the video camera 13a becomes an apparatus to be controlled; when the selection number n of the video camera is set to be "2", the video camera 13b becomes an apparatus to be controlled; when the selection number n of the video camera is set to be "3", the video camera 13c becomes an apparatus to be controlled; and the same applies to other video cameras.

In step S3, the switch 55 is connected to the video and operation control line m of the video camera n.

An initialization command (I0) is supplied via the external interface circuit 43 (FIG. 3) of the video camera 13 to set the direction of the video camera to have the pan angle=0 and the tilt angle=0 (step S4). Note that leaf switches (not shown) are respectively attached to the positions corresponding to the pan and tilt angles=0, a pan maximum moving position, and a tilt maximum moving position. When the pan control motor 40 and the tilt control motor 42 are driven and these leaf switches are turned on, the operation processing unit 44 recognizes an absolute position. The pan control motor 40 and the tilt control motor 42 are driven from this recognized position to set the movable portion 34 at an initial position.

The control apparatus 1 supplies a status signal return command (T0) to the video camera 13 via the external interface circuit 43 (step S5), and checks in step S6 if initialization is completed. When initialization is not completed, the video camera 13 sends a status code M1 indicating "now operating" to the control apparatus 1, and the control apparatus 1 is set in a standby state. When initialization is completed, the video camera 13 sends back an operation end status code M0 to the control apparatus 1, and the flow advances to step S7. At this time, the control apparatus 1 causes the monitor 11 to display a camera view icon of the video camera 13a to inform to an operator that the video camera 13a is operable.

In step S7, a camera function request command (T1) is supplied from the interface controller 12 to the video camera 13a. It is then checked if camera function information is sent to the control apparatus 1. When the camera function information is not sent yet, the control apparatus 1 waits for a predetermined period of time until the information is sent (step S8). This wait time is counted by a timer, and when the above-mentioned function information (see FIG. 10) is sent during the count operation of the timer, the flow advances to step S9 in FIG. 12 to store the received function information in the storage unit 2 in the control apparatus 1. Furthermore, a view icon corresponding to the function of the video camera 13a is displayed on the monitor 11.

The flow then advances to step S10 to increment the counter m of the switch 55 and the selection number n of the video camera by "1" to switch the switch 55, and it is checked if the functions of all the video cameras are read (step S11).

If the functions of all the cameras are not read yet, the flow returns to step S3 to repeat the processing in steps S3 to S10; otherwise, it is checked if the view icon of the video camera 13a is double-clicked by the mouse 15 (step S12). If NO in step S12, the flow advances to step S15 (FIG. 13); otherwise, a command for displaying a video image on the display picture 59 is supplied to the superimposing controller 17 via the bus 8 (step S13), thereby displaying an image on the display picture 59 (step S14).

The read-out operations of the function information can be similarly performed for the remaining video cameras 13b to 13e. On the other hand, if the reception timer of the status information and the function information reaches a time-out state in step S8, it is determined that the corresponding video camera has no movable portion. More specifically, a video camera which causes a time-out state has neither the pan function nor the tilt function.

It is checked in step S15 if the pan control cursor 61 is designated. If NO in step S15, the flow advances to step S17; otherwise, the moving angle θ, in the pan direction, of the video camera 13a is calculated in correspondence with the absolute position of the pan control cursor 61, and an absolute moving angle is supplied from the interface controller 12 to the video camera 13a using a U5+ extension to change the angle (step S16). Thereafter, the flow jumps to step S23.

Similarly, it is checked in step S17 if the tilt control cursor 63 is designated. If NO in step S17, the flow advances to step S19; otherwise, the moving angle θ, in the tilt direction, of the video camera 13a is calculated in correspondence with the absolute position of the tilt control cursor 63, and an absolute moving angle is supplied from the interface controller 12 to the video camera 13a using a U6+ extension to change the angle (step S18). Thereafter, the flow jumps to step S23.

Similarly, it is checked in step S19 if the iris control cursor 60 is designated. If NO in step S19, the flow advances to step S21; otherwise, the iris amount of the video camera 13a is calculated in correspondence with the absolute position of the iris control cursor 60, and an absolute iris value is supplied from the interface controller 12 to the video camera 13a using an E5+ extension (step S20). Thereafter, the flow jumps to step S23. More specifically, the iris full open position corresponds to the leftmost position of the cursor, the iris full stop-down position corresponds to the rightmost position of the cursor, and an intermediate iris position is proportionally allocated in correspondence with each different cursor position.

Similarly, it is checked in step S21 if the zoom control cursor 62 is designated. If NO in step S21, the flow returns to step S12; otherwise, the zoom amount of the video camera 13a is calculated in correspondence with the absolute position of the zoom control cursor 62, and an absolute zoom value is supplied from the interface controller 12 to the video camera 13a using a Z5+ extension (step S22). Thereafter, the flow jumps to step S23. More specifically, the interval between maximum and minimum zoom positions is proportionally allocated in correspondence with different positions of the zoom control cursor 62 as in the control of the iris control cursor 60.

In step S23, a status signal return request command (T0) is sent from the interface controller 12 to the video camera 13a to check the execution state of the above-mentioned camera operation control command, and it is then checked if a status signal indicating completion of execution of the command is returned (step S24). More specifically, the control waits for input of a status signal indicating completion of execution of the command from the video camera, and when execution of the command is completed, the flow returns to step S11 to continue the processing. By switching the switch 55, the above-mentioned operation is similarly performed for the remaining video cameras 13b to 13e.

In this manner, after the power switches of the video cameras 13a to 13e are turned on, function information such as the size of the CCD 53, the pan/tilt movable range, and the like of each of the video cameras 13a to 13e is supplied to the control apparatus, and the operations of the plurality of video cameras 13a to 13e can be controlled in accordance with the function information. For this reason, a man-machine interface corresponding to the functions of the video cameras 13 can be constituted. More specifically, when the video cameras 13a to 13e have different function information, the operator M need not switch a device driver software program in correspondence with the video cameras 13a to 13e to execute control, thus improving convenience. The load on the operator is reduced, and the operator can accurately and efficiently control the photographing operations of various video cameras by a simple operation while observing the display picture 59 on the monitor 11.

Figure 14:
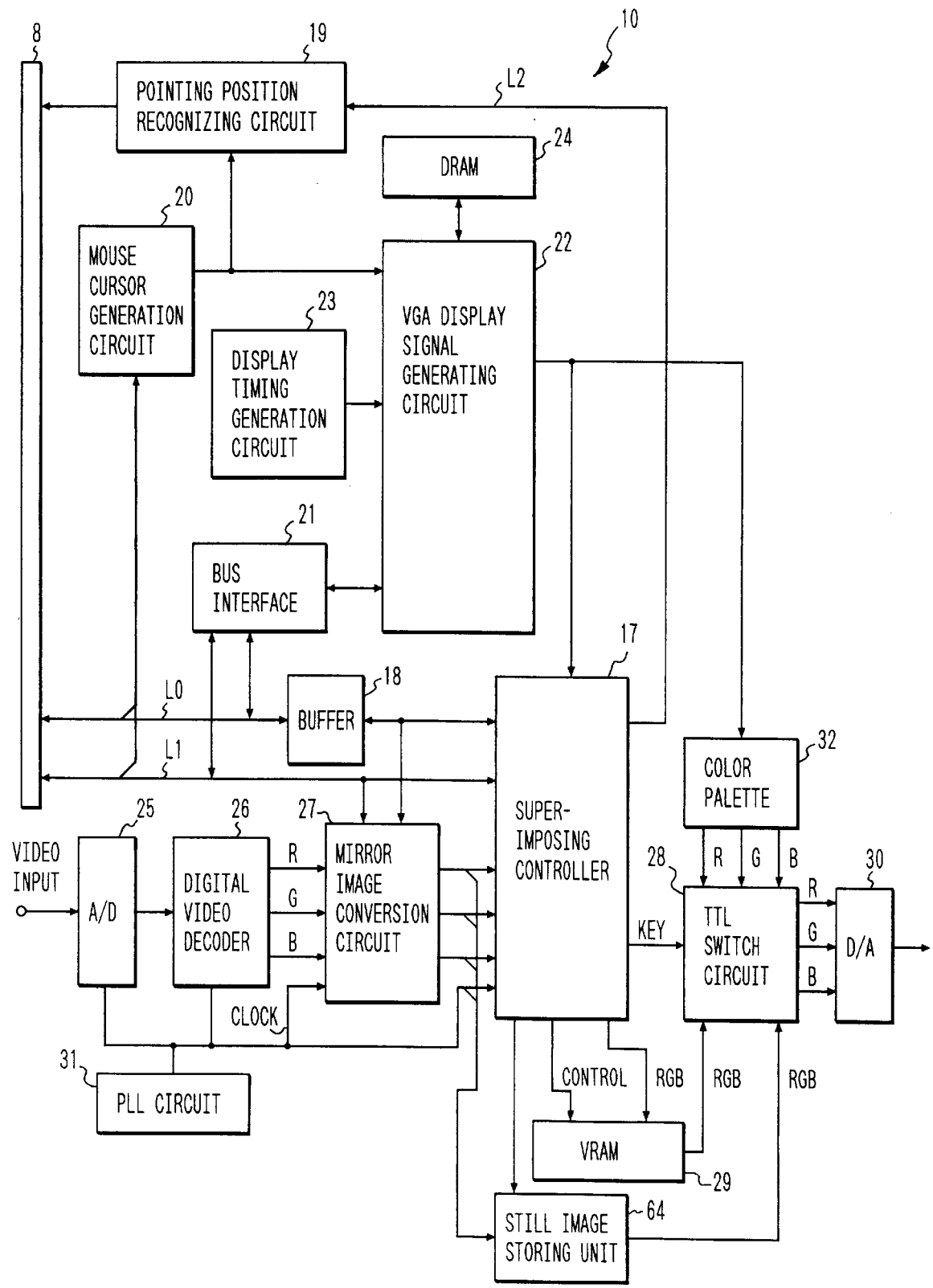
FIG. 14 is a block diagram showing the arrangement of an image synthesization circuit as the second embodiment of a control apparatus for a video camera according to the present invention.
Figure 15:
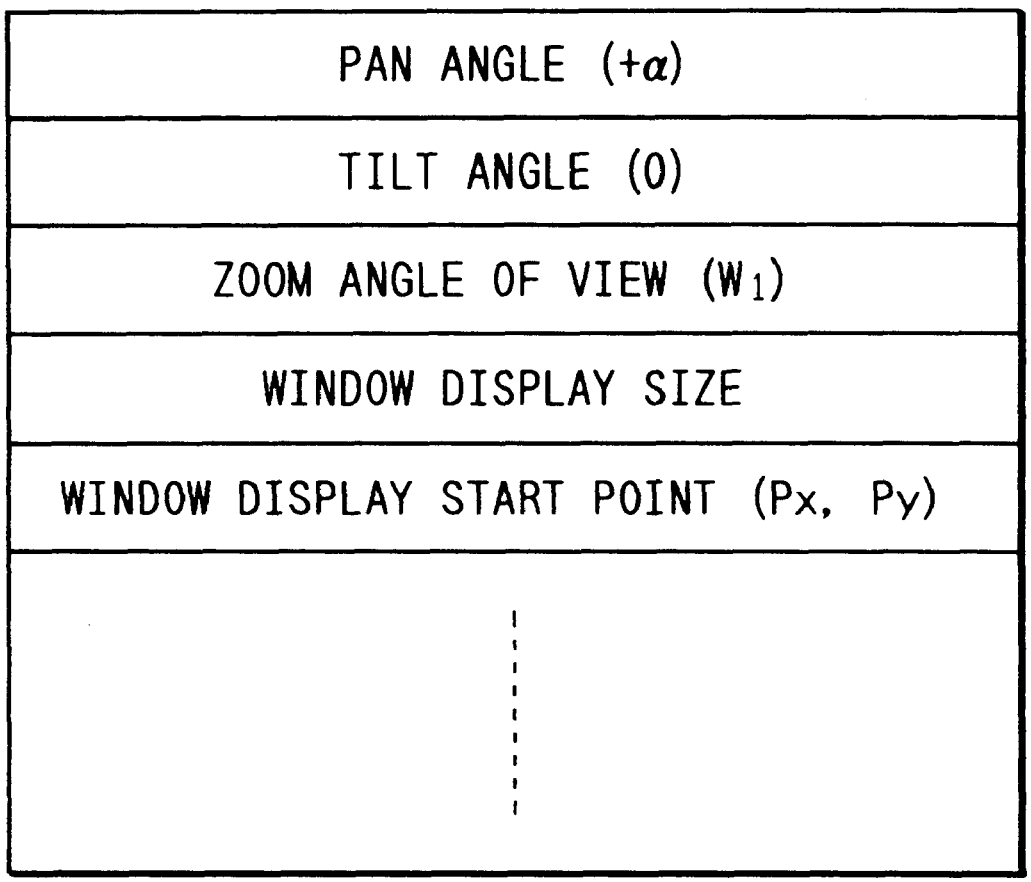
FIG. 15 is a table showing an example of data stored in a still image storing unit of the image synthesization circuit.

FIG. 14 is a block diagram showing an image synthesization circuit 10 as the second embodiment of a control apparatus according to the present invention. The same reference numerals in FIG. 14 denote the same parts as in FIG. 2, and a detailed description thereof will be omitted. In FIG. 14, a still image storing unit 64 for storing a video signal output from each of the video cameras 13a to 13e as a still image is added. More specifically, the still image storing unit 64 is connected to the A/D converter 25, the digital video decoder 26, the PLL circuit 31, the mirror image conversion circuit 27, the superimposing controller 17, and the TTL switch 28. The storing unit 64 receives a video signal output from each of the video cameras 13a to 13e, and also receives a control signal from each video camera 13 via the interface controller 12, the bus 8, and the superimposing controller 17. More specifically, as shown in FIG. 15, the still image storing unit 64 sequentially stores position information signals indicating a pan angle (+α), a tilt angle (0), a zoom angle of view (W1), and the like which are input in this order from each video camera 13.

Figure 16:
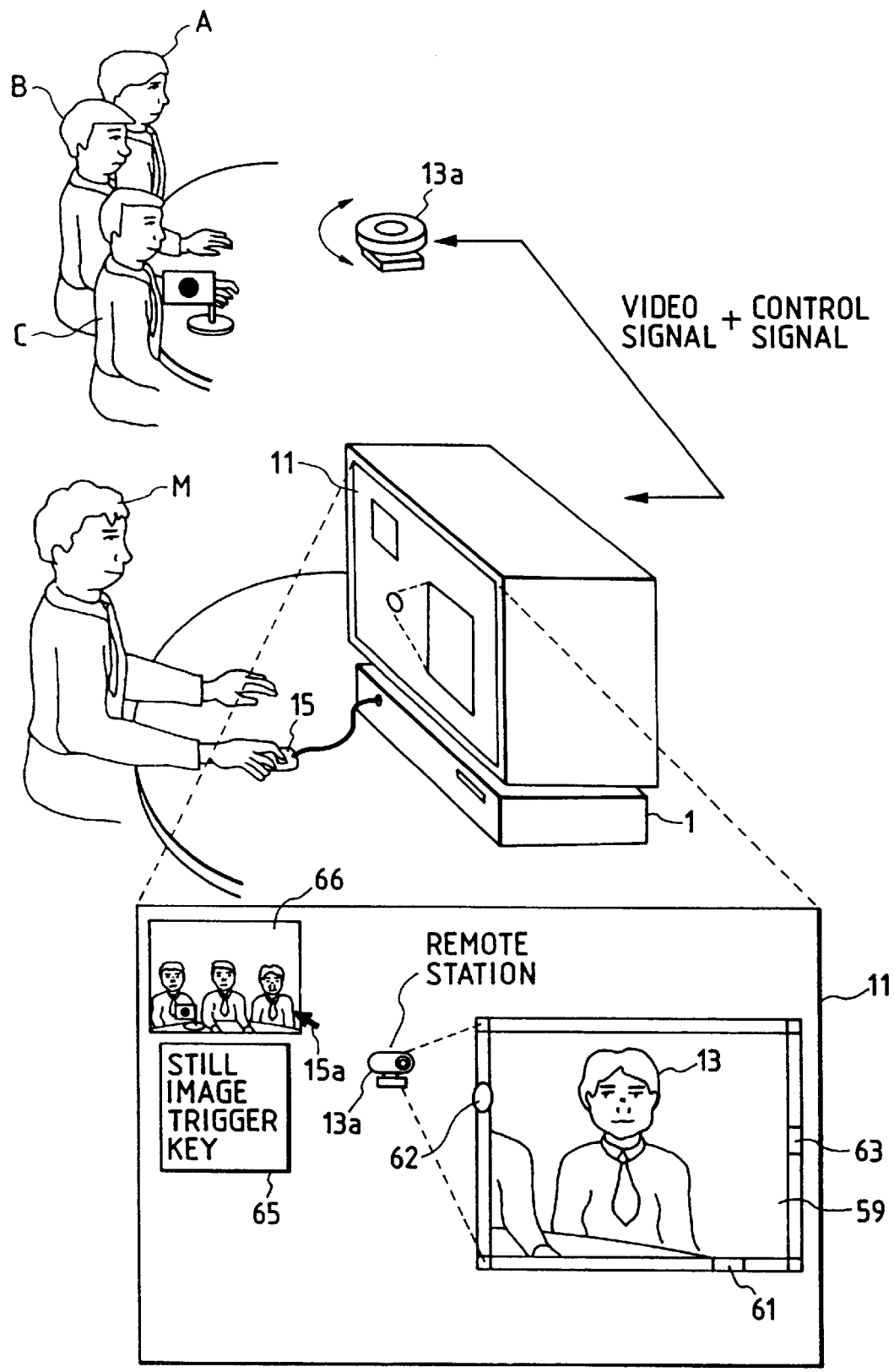
FIG. 16 is a view showing a state wherein both a still image and a moving image are displayed on a display picture.

In the second embodiment, as shown in FIG. 16, the monitor 11 has a still image trigger key 65 and a still image display picture 66 in addition to the moving image display picture 59 for displaying a moving image picked up by the video camera. The still image display picture 66 displays a still image which is read out upon operation of the still image trigger key 65.

Figure 17A:
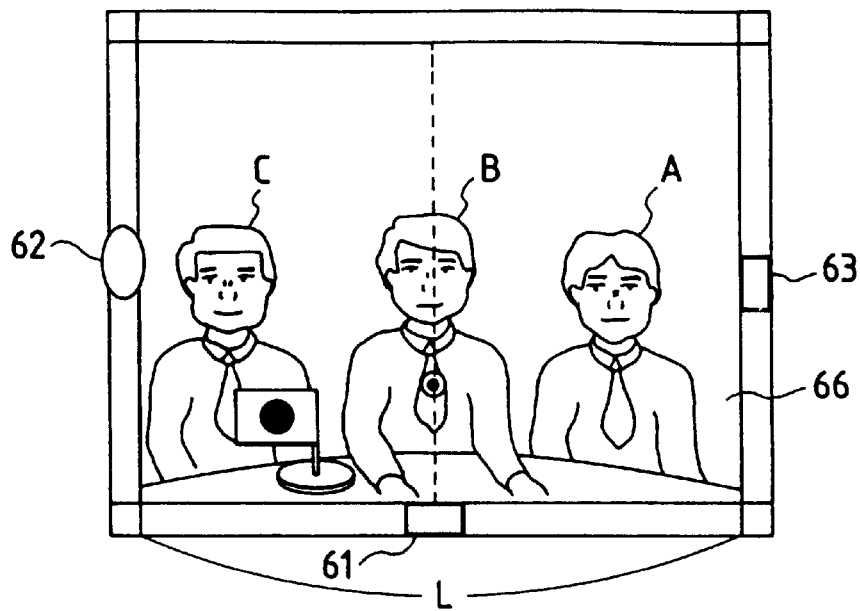
FIGS. 17A and 17B are views showing the positional relationship between a display on a moving image region and objects at that time.
Figure 17B:
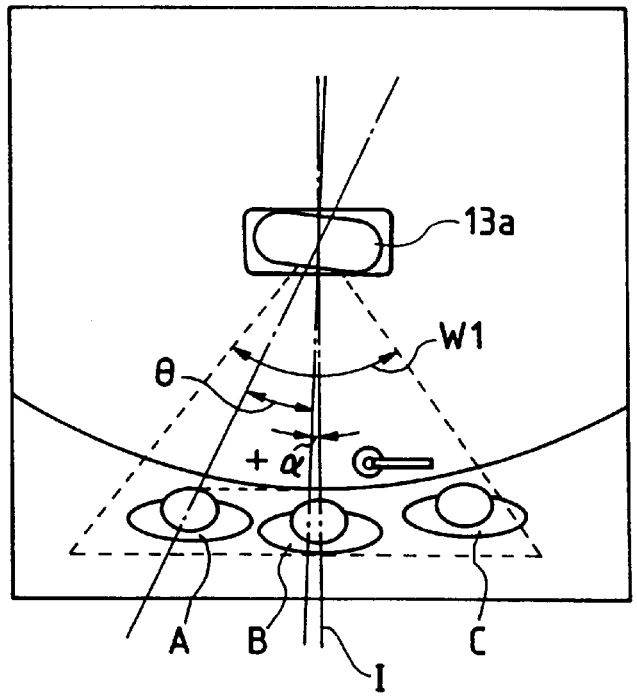

FIGS. 17A and 17B show the positional relationship between an image displayed on the still image display picture 66 upon operation of the still image trigger key 65, and object persons at that time. FIG. 17A shows the still image, and FIG. 17B is a plan view of a photographing room.

Figure 18A:
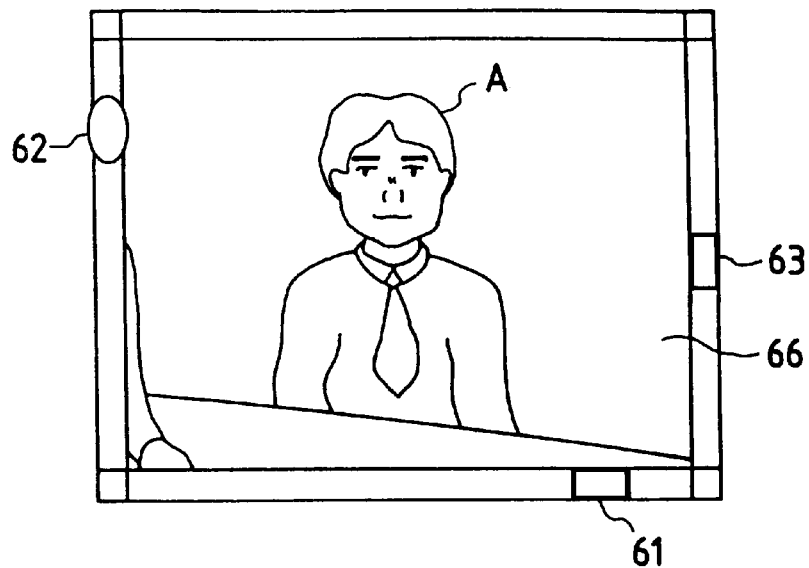
FIGS. 18A and 18B are views showing a display on the moving image region and the direction of the video camera at that time.
Figure 18B:
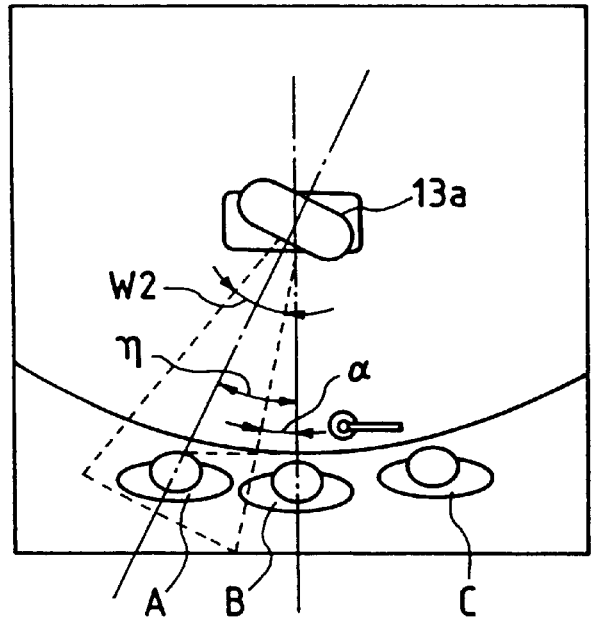

More specifically, after the power switch of the video camera 13a is turned on and the video camera 13a is initialized, the direction of the video camera 13a is set at an initialize position I. When the pan control cursor 61 is dragged by operating the mouse 15 and the still image trigger key 65 is clicked at a position rotated by (+α) in the pan direction, the image shown in FIG. 17A is stored in the still image storing unit 64. More specifically, the still image storing unit 64 stores position information signals indicating the pan angle (+α), the tilt angle (0), the zoom angle of view (W1), and the like in this order, as described above. When the video camera 13a is rotated by (η−α) in the pan direction by moving the pan control cursor 61 and the zoom control cursor 62 so as to be directed in the direction of an object person A, as shown in FIG. 18B, the zoom angle of view changes from the angle W1 of view to an angle W2 of view, and this change amount is stored in the storage unit 2.

Figure 19A:
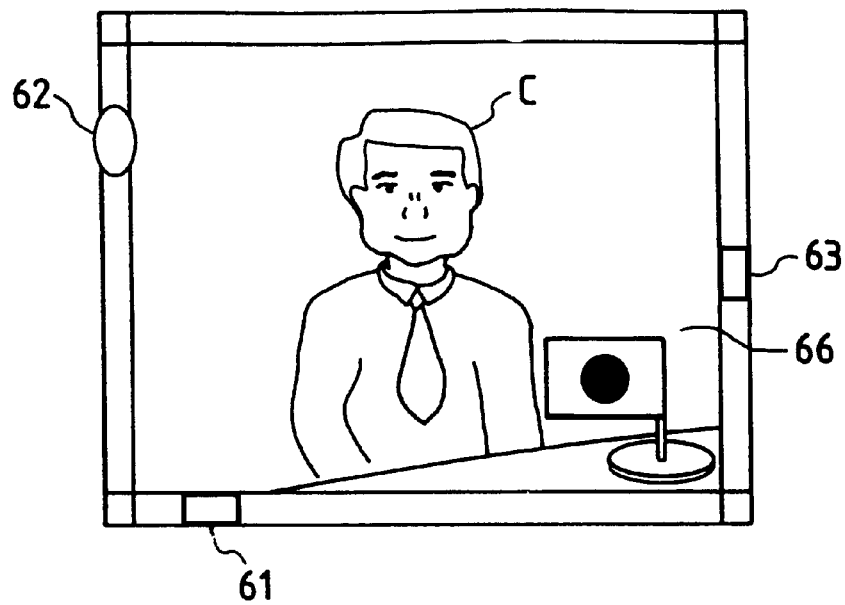
FIGS. 19A and 19B are views showing a display on the moving image region and the direction of the video camera upon completion of direction control of the video camera.
Figure 19B:
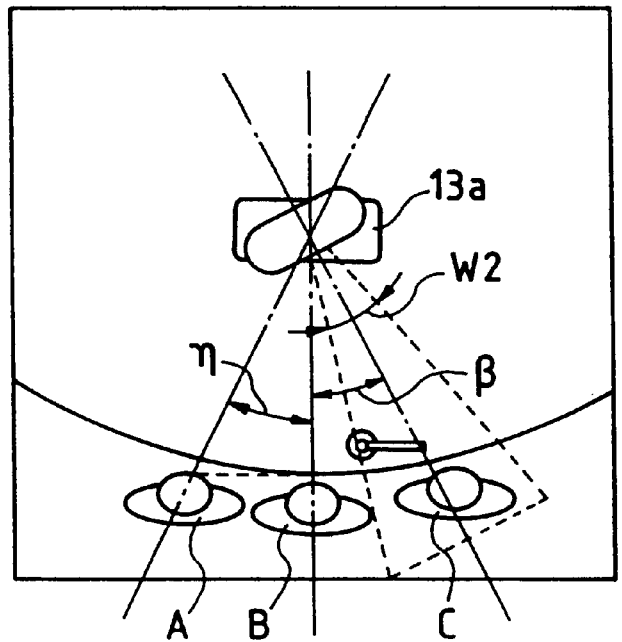
Figure 20:
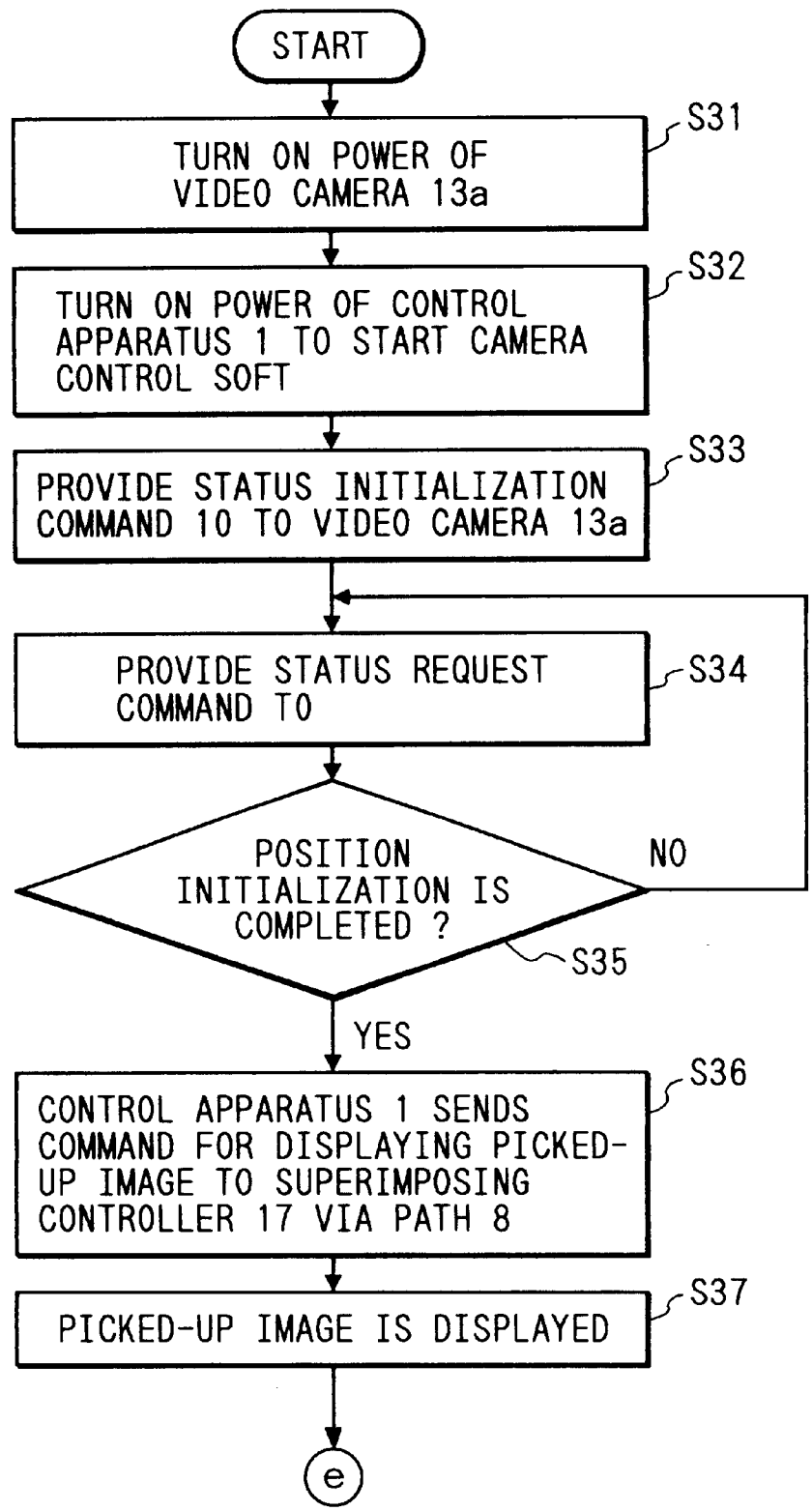
FIG. 20 is a flow chart showing the control sequence of the second embodiment.

When an object person A is zoomed up from this camera position while maintaining the zoom angle W2 of view, the pan control cursor 60 and the like may be moved by controlling the mouse 15 as in a case wherein the object person B is displayed at the central position. However, if the cursor is moved each time the direction of the video camera is changed, this results in a cumbersome operation and a heavy load on an operator especially in, e.g., a video conference in which different persons speak by turns. Thus, in this embodiment, as shown in FIG. 18A, the mouse 15 is clicked in a state wherein the object person A is zoomed up and the mouse cursor 15a is maintained at a position shown in FIG. 16 so as to realize direction control of the video camera toward the still object person A. Similarly, as shown in FIG. 19B, when the video camera 13a is rotated by −(η+β) from the current position in the pan direction, the video camera 13a can be direction-controlled toward the object person C. Similarly, when a camera movement in the tilt direction is to be attained, the video camera can be controlled to a target position by designating an upper or lower position of the still image display picture 66.

FIGS. 20 to 23 are flow charts showing the control sequence of the second embodiment.

The power switches of the video camera 13a and the control apparatus 1 are turned on (steps S31 and S32). The control apparatus 1 supplies an initialization command (I0) to the video camera 13a via the external interface circuit 43 (FIG. 3) to set the direction of the video camera 13a at an initial position (the pan angle=0 and the tilt angle=0) (step S33). The control apparatus 1 supplies a status signal return request command (T0) to the video camera 13a via the external interface circuit 43 (step S34) and checks if initialization is completed (step S35). If NO in step S35, flow returns to step S34 to wait for completion of the initialization; otherwise, the video camera 13a returns an initialization end status signal to inform to the control apparatus 1 that the video camera 13a is operable. The CPU 9 supplies a command for displaying a photographed image on the display picture 59 to the superimposing controller 17 via the bus 8 (step S36), and an image photographed by the video camera 13a is displayed on the display picture 59 (step S37).

Figure 21:
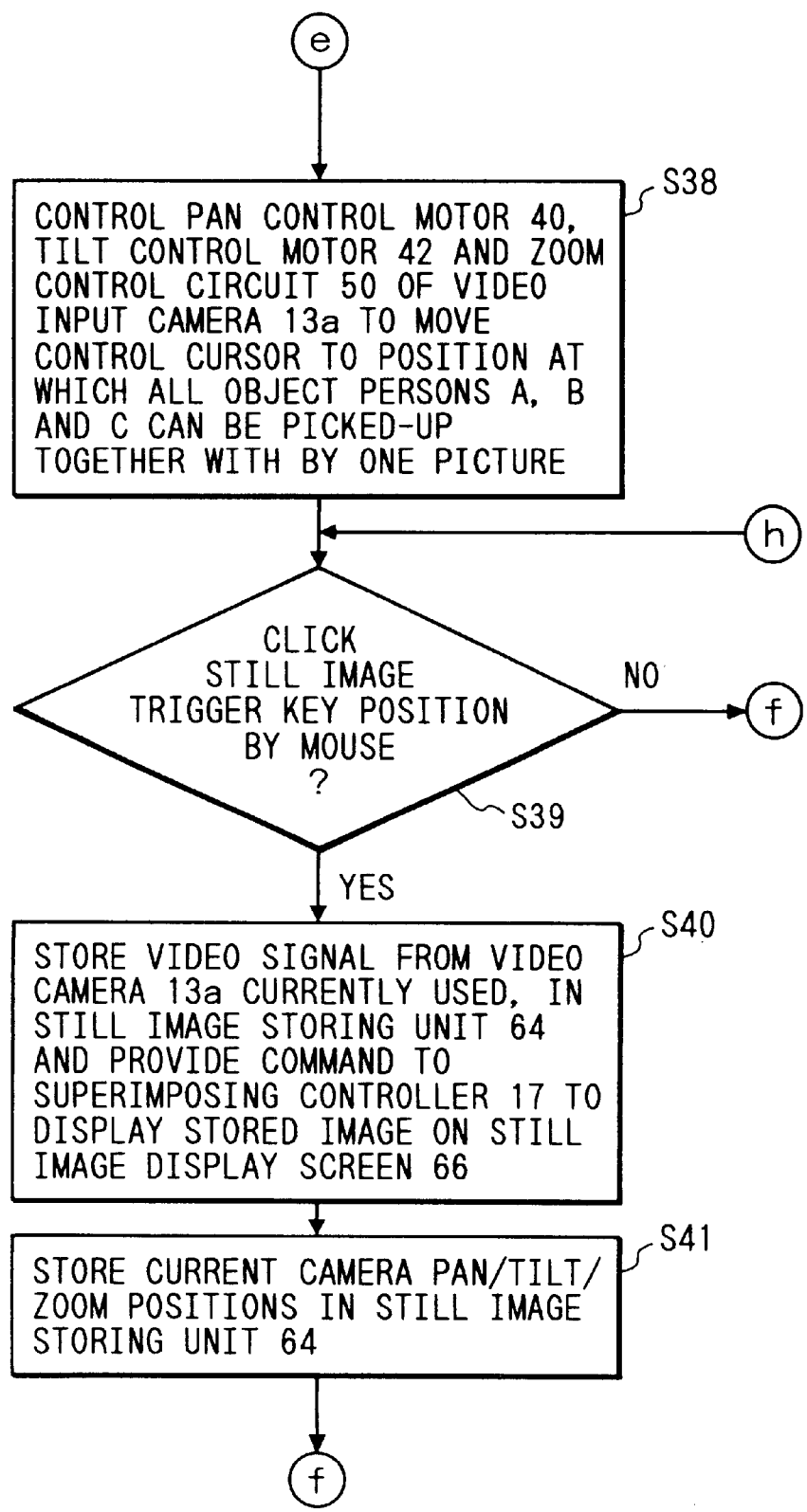
FIG. 21 is a flow chart showing the control sequence of the second embodiment.
Figure 22:
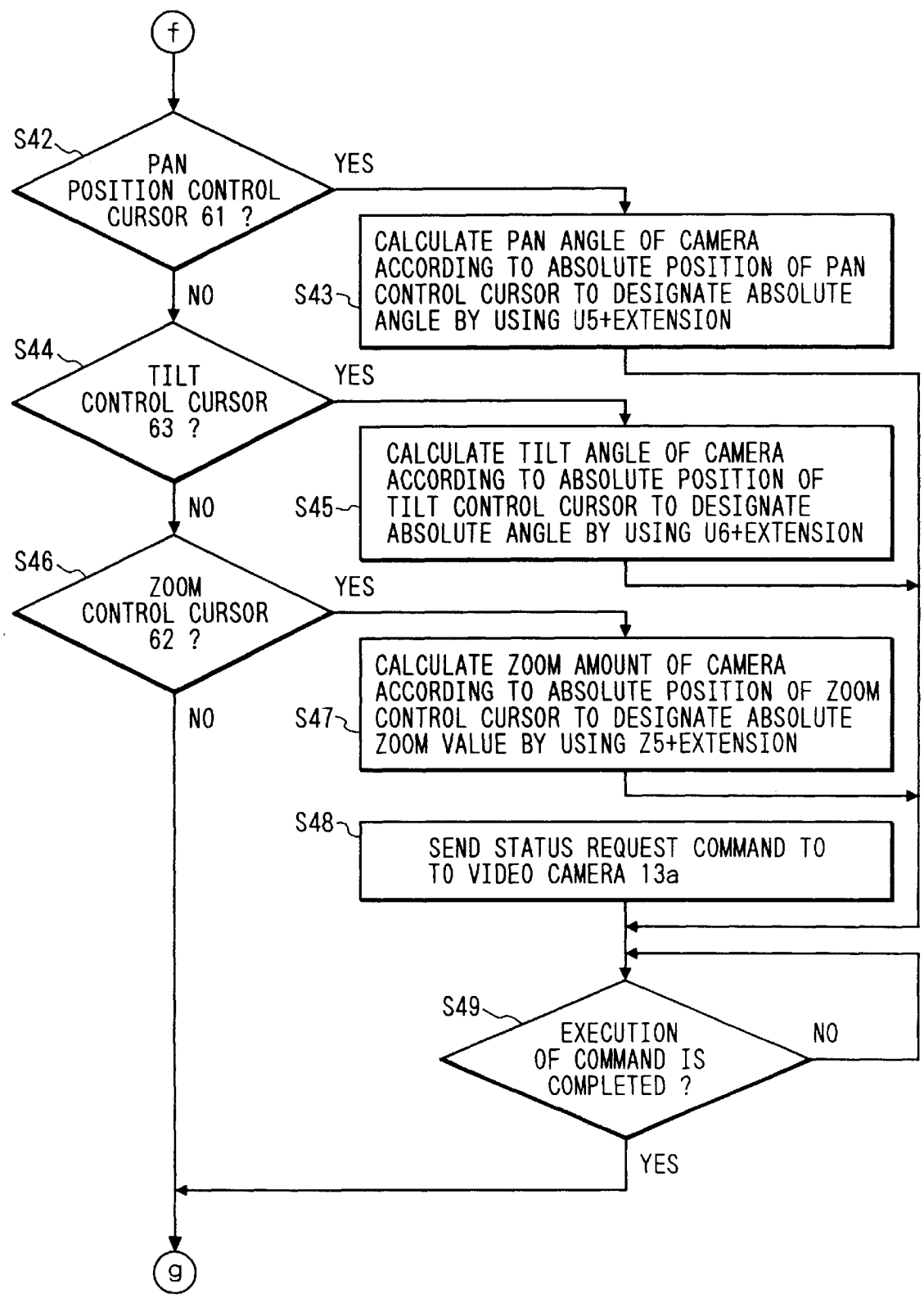
FIG. 22 is a flow chart showing the control sequence of the second embodiment.
Figure 23:
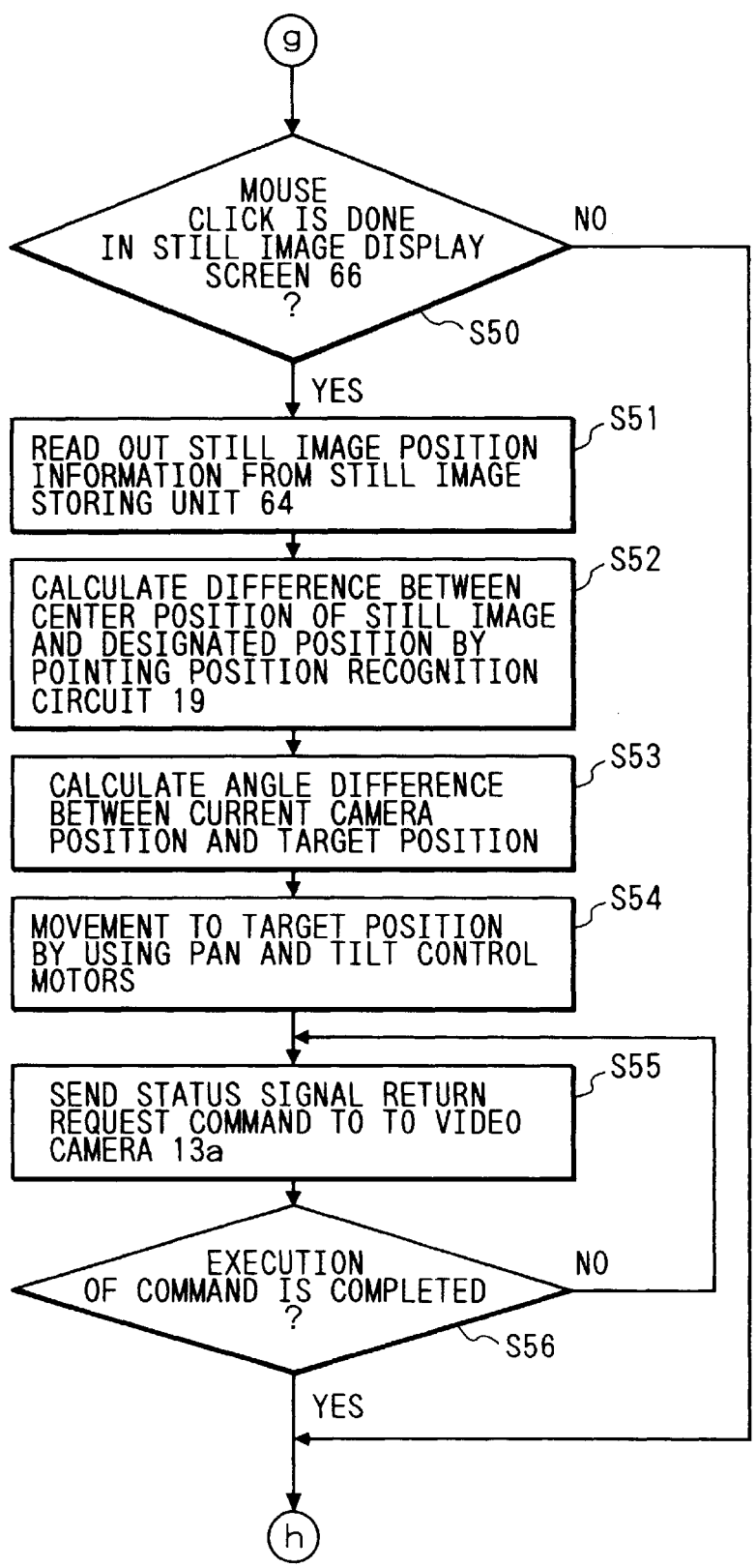
FIG. 23 is a flow chart showing the control sequence of the second embodiment.

The flow then advances to step S38 in FIG. 21, and the zoom lens 49 is moved by controlling the pan control motor 40, the tilt control motor 42, and the zoom control circuit 50 of the video camera 13a using the pan control cursor 61, the tilt control cursor 63, and the zoom control cursor 62 until all object persons A, B, and C are photographed together by one camera picture (step S38). It is then checked if the mouse 15 clicks the still image trigger key 65 (step S39). If NO in step S39, the flow advances to step S42 (FIG. 22); otherwise, the object persons A, B, and C are displayed on the display picture 59, the video signal from the video camera 13a at that time is stored in the still image storing unit 64, and a command is issued to the superimposing controller 17 to read out the stored still image and to display the readout still image on the still image display picture 66 (step S40). The flow then advances to step S41 to store the pan/tilt/zoom positions at that time in the still image storing unit 64.

It is checked in step S42 if the pan control cursor 61 is designated. If NO in step S42, the flow advances to step S44; otherwise, the moving angle θ, in the pan direction, of the video camera 13a is calculated in correspondence with the absolute position of the pan control cursor 61, and an absolute moving angle is supplied to the video camera 13a using a U5+ extension to change the angle (step S43). Thereafter, the flow jumps to step S48.

Similarly, it is checked in step S44 if the tilt control cursor 63 is designated. If NO in step S44, the flow advances to step S46; otherwise, the moving angle θ, in the tilt direction, of the video camera 13a is calculated in correspondence with the absolute position of the tilt control cursor 63, and an absolute moving angle is supplied to the video camera 13a using a U6+ extension to change the angle (step S45). Thereafter, the flow jumps to step S48.

Similarly, it is checked in step S46 if the zoom control cursor 62 is designated. If NO in step S46, the flow returns to step S50; otherwise, the zoom amount of the video camera 13a is calculated in correspondence with the absolute position of the zoom control cursor 62, and an absolute zoom value is supplied to the video camera 13a using a Z5+ extension (step S47). Thereafter, the flow jumps to step S48. More specifically, the interval between maximum and minimum zoom positions is proportionally allocated in correspondence with different positions of the zoom control cursor 62.

In step S48, a status signal return request command (T0) is sent to the video camera 13a to check the execution state of the above-mentioned camera operation control command, and it is then checked if a status signal indicating completion of execution of the command is returned (step S49). More specifically, the control waits for input of a status signal indicating completion of execution of the command from the video camera, and when execution of the command is completed, the flow advances to step S50 (FIG. 23) to check if the mouse is clicked in the range of the still image display picture 66. If NO in step S50, the flow returns to step S39; otherwise, the still image position information is read out from the still image storing unit 64 (step S51), and a difference between the central position of the still image and the designated position is calculated by the pointing position recognizing circuit 19 (step S52).

The angle difference from the current camera position to the target position is then calculated (step S53), and the pan control motor 40 and the tilt control motor 42 are driven to move the video camera to the target position (step S54). Then, a status signal return request command T0 is sent to the video camera 13a (step S55) and it is checked if execution of the command is completed (step S56). If NO in step S56, the control waits for completion of execution of the command; otherwise, the flow returns to step S39 to repeat the above-mentioned processing.

As described above, according to the second embodiment, an image photographed by the video camera 13a and a still image are simultaneously displayed on windows on the monitor 11, and when a required position on the still image is designated by the mouse 15, the photographing operation of the video camera 13a is controlled, so that the required position is located at the center of the moving image. When the pan control cursor 61, the tilt control cursor 63, and the zoom control cursor 62 displayed on the display picture 59 on the monitor 11 are designated and controlled by the mouse 15, the display control of a video image can be attained. For this reason, the load on an operator can be reduced by a simple operation, and the photographing operation of the video camera can be accurately and efficiently performed with a natural feeling while observing an image displayed on the monitor 11. More specifically, an object is photographed at a wide-angle zoom position, the photographed image is displayed as a still image, and the direction control of the camera can be easily realized by operating the mouse in the picture of the still image displayed on the monitor 11.

As described above, in the second embodiment, in control of the camera having a rotary mechanism portion such as a tripod, the direction of the camera can be easily controlled to a required object person by photographing an object at a wide-angle zoom position and pointing the position of the required object person in the photographed image displayed as a still image on the monitor.

The third embodiment of the present invention will be described below with reference to FIGS. 24 and 25.

Figure 24:
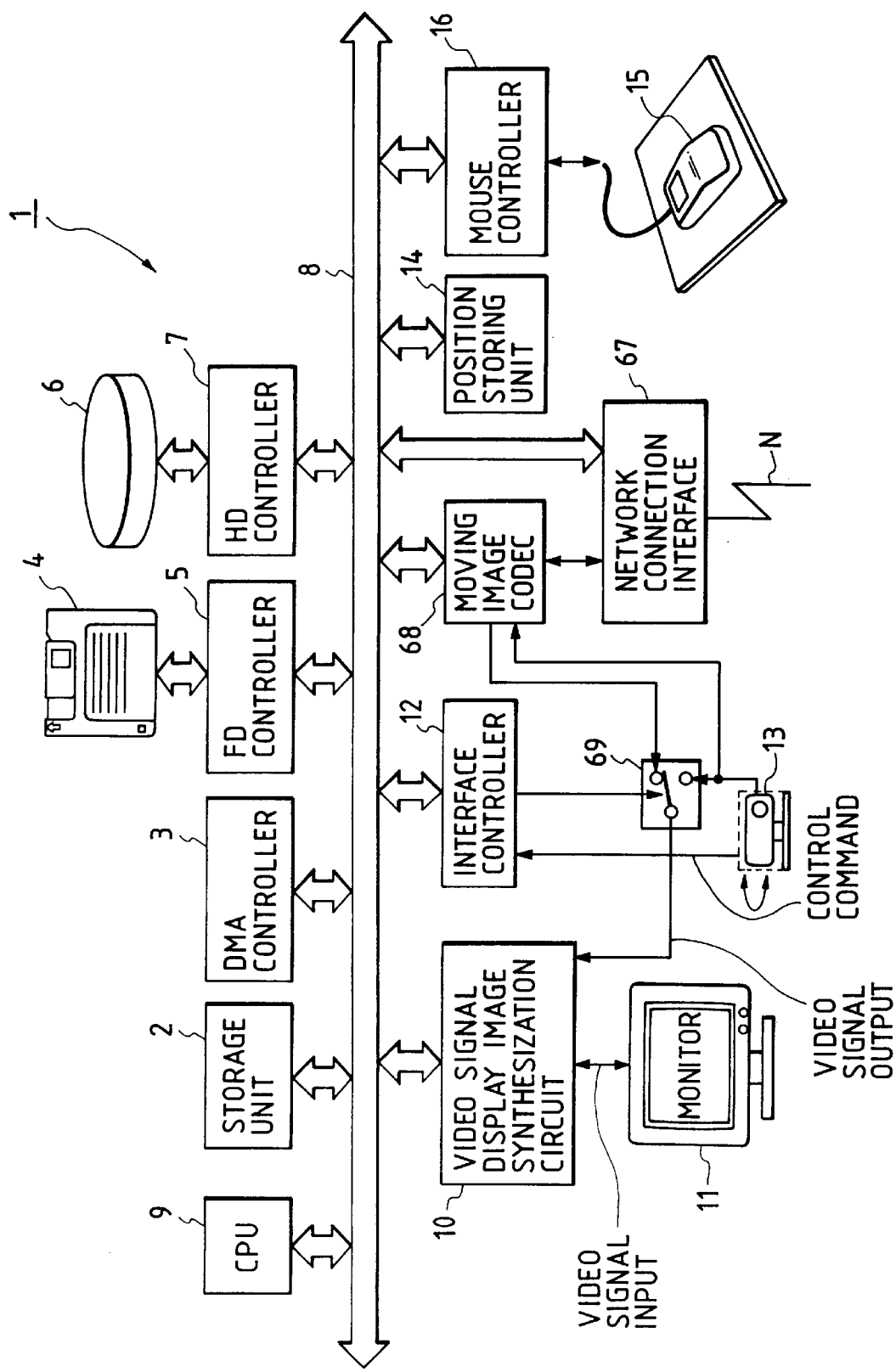
FIG. 24 is a block diagram showing the arrangement of a control apparatus for a video camera according to the third embodiment of the present invention.

FIG. 24 is a block diagram showing a control apparatus for a video camera according to the third embodiment of the present invention. The same reference numerals in FIG. 24 denote the same parts as in FIG. 1, and a detailed description thereof will be omitted. A local terminal and a remote terminal are connected via a communication network N such as an ISDN line or a LAN line. More specifically, the communication network N is connected to the bus 8 of the control apparatus 1 via a network connection interface 67. A moving image CODEC 68 is connected between the bus 8 and the network interface 67, and is connected to the video image synthesization circuit 10 via a switch 69. A control command transmitted from a video camera in the remote station via the communication network N is supplied onto the bus 8. On the other hand, moving image data transmitted from the video camera in the remote station is expanded by the moving image CODEC 68, the expanded data is transmitted to the image synthesization circuit 10 via the switch 69, and the video signal is output to the monitor 11. Moving image information output from the video camera 13 in the local station is compressed by the moving image CODEC 68, and is transmitted to the video camera in the remote station via the communication network N. In this manner, inter communications can be performed by compressing/expanding information on the communication network to reduce the information amount.

Figure 25:
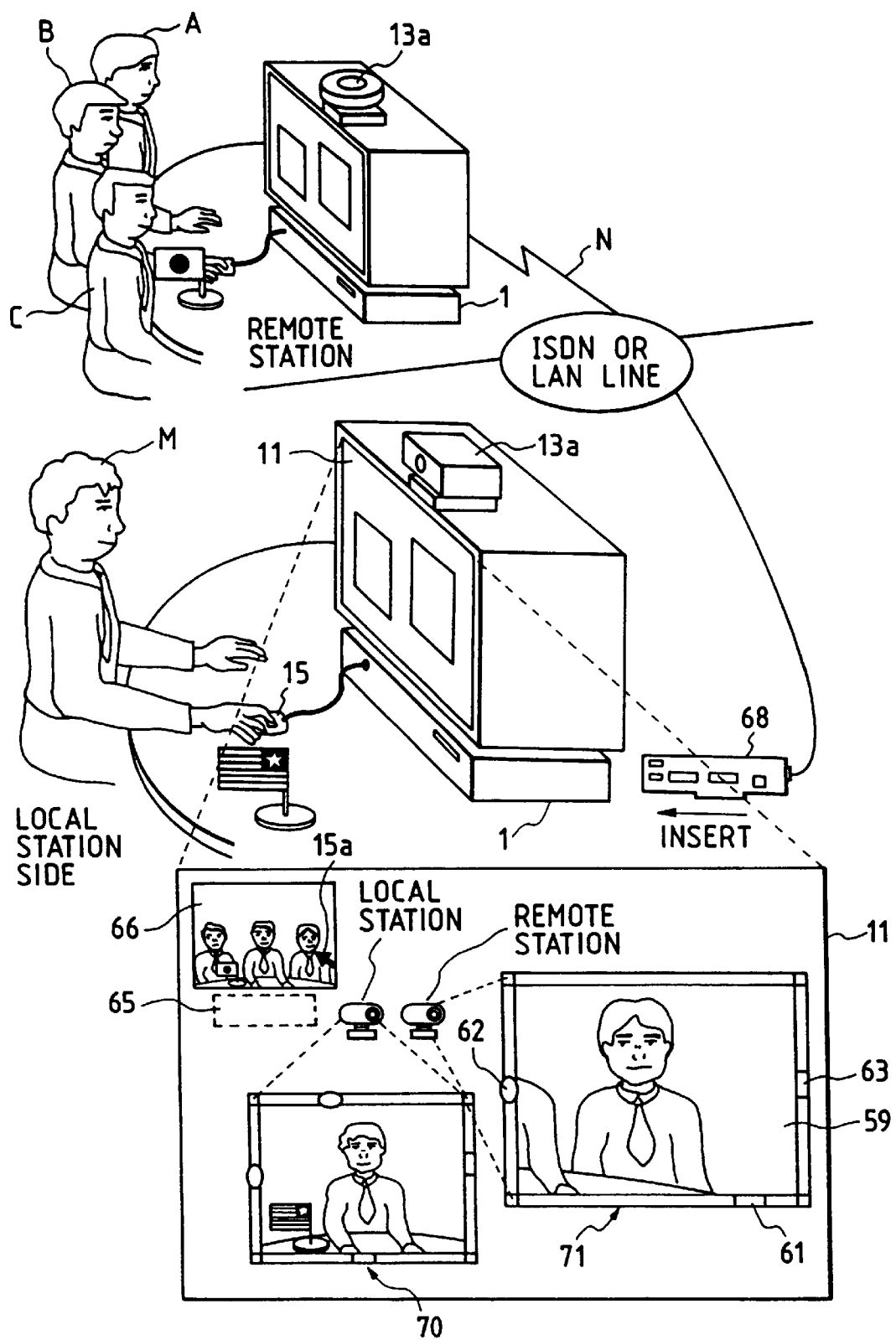
FIG. 25 is a view showing a state wherein both a still image and a moving image are displayed on a display picture in the third embodiment.

FIG. 25 shows the operation state and the display state of the third embodiment.

More specifically, the monitor 11 has the still image display picture 66, the still image trigger key 65, a local station image display screen 70, and a remote station image display screen 71, and the display state of the local and remote station image display screens 70 and 71 can be controlled on the monitor 11 by operating the mouse 15 connected to the control apparatus 1 of the local station. The moving image CODEC 68 is detachable from the control apparatus 1, and can be attached to a terminal (not shown) provided to the back surface side of the control apparatus 1.

As described above, according to the third embodiment, a local terminal and a remote terminal are connected to each other via the communication network N, and each terminal is provided with the control apparatus 1 comprising the monitor 11. When the control apparatus 1 is controlled by the mouse 15 in at least one terminal, a local station moving image, and moving and still images from the video camera in the remote station can be simultaneously displayed on windows on the picture of the monitor 11. In this state, when a required pixel position of the still image display picture 66 is designated by the mouse cursor 15a by operating the mouse 15, the photographing operation of the video camera 13 can be controlled to locate the designated position at the center of the picture. In this manner, in the third embodiment as well, the load on an operator can be reduced by a simple operation, and the photographing operation of the video camera can be accurately and efficiently performed with a natural feeling while observing an image displayed on the monitor 11.

Figure 26:
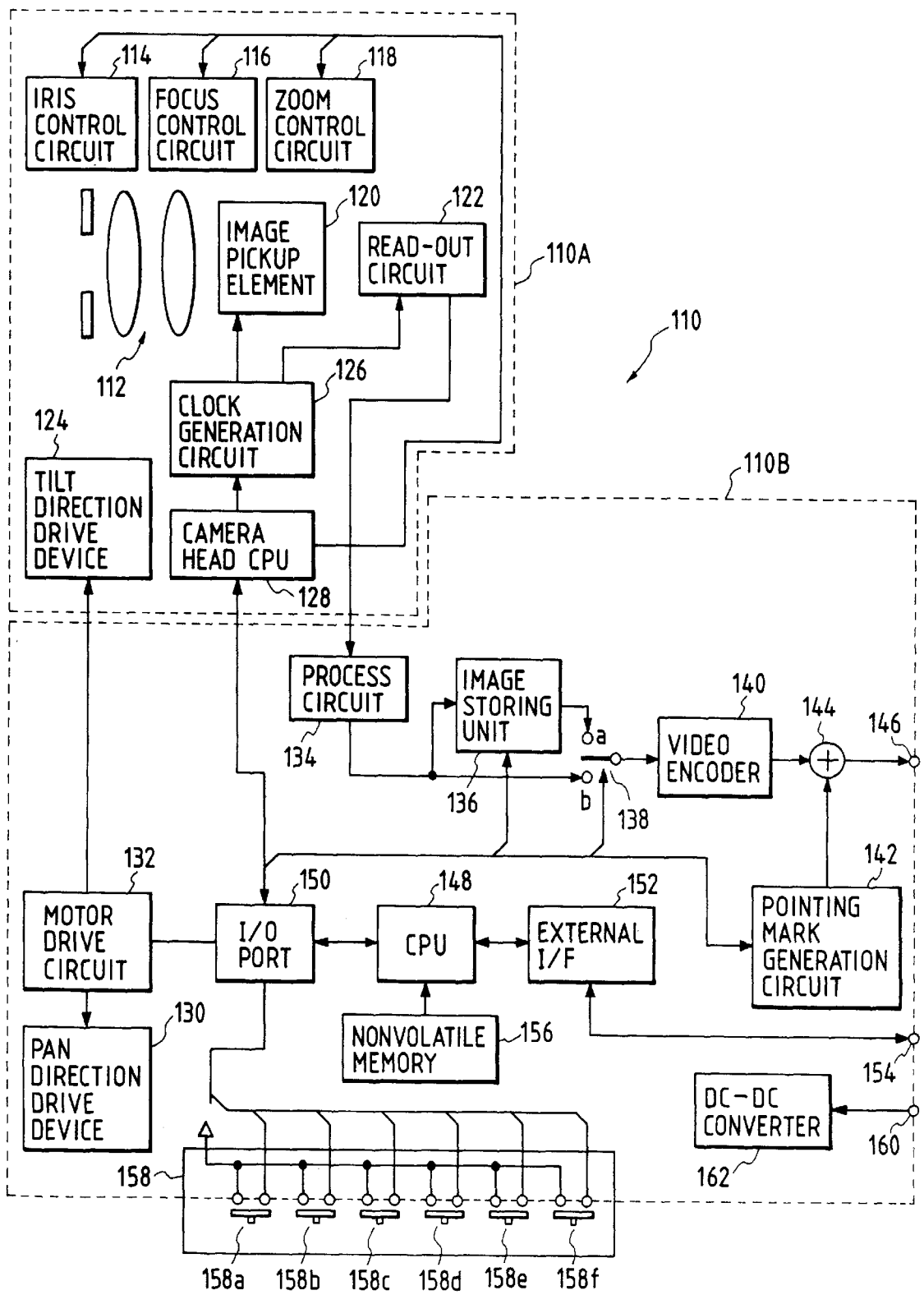
FIG. 26 is a block diagram showing the arrangement according to the fourth embodiment of the present invention.

FIG. 26 is a block diagram showing the arrangement of a video camera with pan and tilt functions according to the fourth embodiment of the present invention. Referring to FIG. 26, a video circuit portion 110B controls a camera head movable portion 110A, and processes an image signal therefrom.

The camera head movable portion 110A includes a zoom lens 112, an iris control circuit 114 for controlling a light amount, a focus control circuit 116 for controlling the focusing position of the zoom lens 112, a zoom control circuit 118 for controlling the magnification of the zoom lens 112, an image pickup element 120 for converting an optical image from the zoom lens 112 into electrical signals in units of pixels, and a read-out circuit 122 for sequentially reading out the electrical signals from the image pickup element 120.

The camera head movable portion 110A also includes a tilt direction drive device 124, comprising, e.g., a stepping motor and the like, for driving the camera head movable portion 110A in the tilt direction, a clock generation circuit 126 for generating clocks for the image pickup element 120, and a camera head CPU 128 for controlling the iris control circuit 114, the focus control circuit 116, and the zoom control circuit 118 in accordance with a control signal from the video circuit portion 110B.

The video circuit portion 110B includes a pan direction drive device 130, comprising, e.g., a stepping motor and the like, for rotating the camera head movable portion 110A in the pan direction, a motor drive circuit 132 for controlling the motors in the tilt and pan direction drive devices 124 and 130, and a process circuit 134 for generating luminance and chrominance signals on the basis of the output from the read-out circuit 122 in the camera head movable portion The video circuit portion 110B also includes an image storing unit 136 for storing all images in a movable range of the camera head movable portion 110A on the basis of the output from the process circuit 134, a switch 138 for selecting one of the outputs from the process circuit 134 and the image storing unit 136, a video encoder 140 for converting the output from the switch 138 into a video signal of a predetermined standard, a pointing mark generation circuit 142 for generating a pointing mark as an arrow or a marker to be displayed on the picture, an adder 144 for adding the output from the pointing mark generation circuit 142 to the output from the video encoder 140, and a video output terminal 146 for outputting the output from the adder 144 to an external device.

The video circuit portion 110B further includes a CPU 148 for controlling the entire apparatus, an I/O port 150 for supplying a control signal output from the CPU 148 to the respective units, an external interface 152 for interfacing communications between an external control device and the CPU 148, a connection terminal 154 for connecting the external control device, and a nonvolatile memory 156 for storing information of a photographing prohibition region, and information inherent to the apparatus. The nonvolatile memory 156 comprises, e.g., an EEPROM (electrically erasable programmable read only memory), a battery-backed up D-RAM, an S-RAM (static random access memory), or the like.

The video circuit portion 110B also includes switches 158 including an all photographing picture image display switch 158a, a photographing prohibition setting switch 158b, a left-move switch 158c, a right-move switch 158d, an up-move switch 158e, and a down-move switch 158f.

The video circuit portion 110B also includes a power supply input terminal 160 and a DC-DC converter 162 for generating a DC voltage required for the respective units from a DC voltage input from the power supply input terminal 160.

Figure 27:
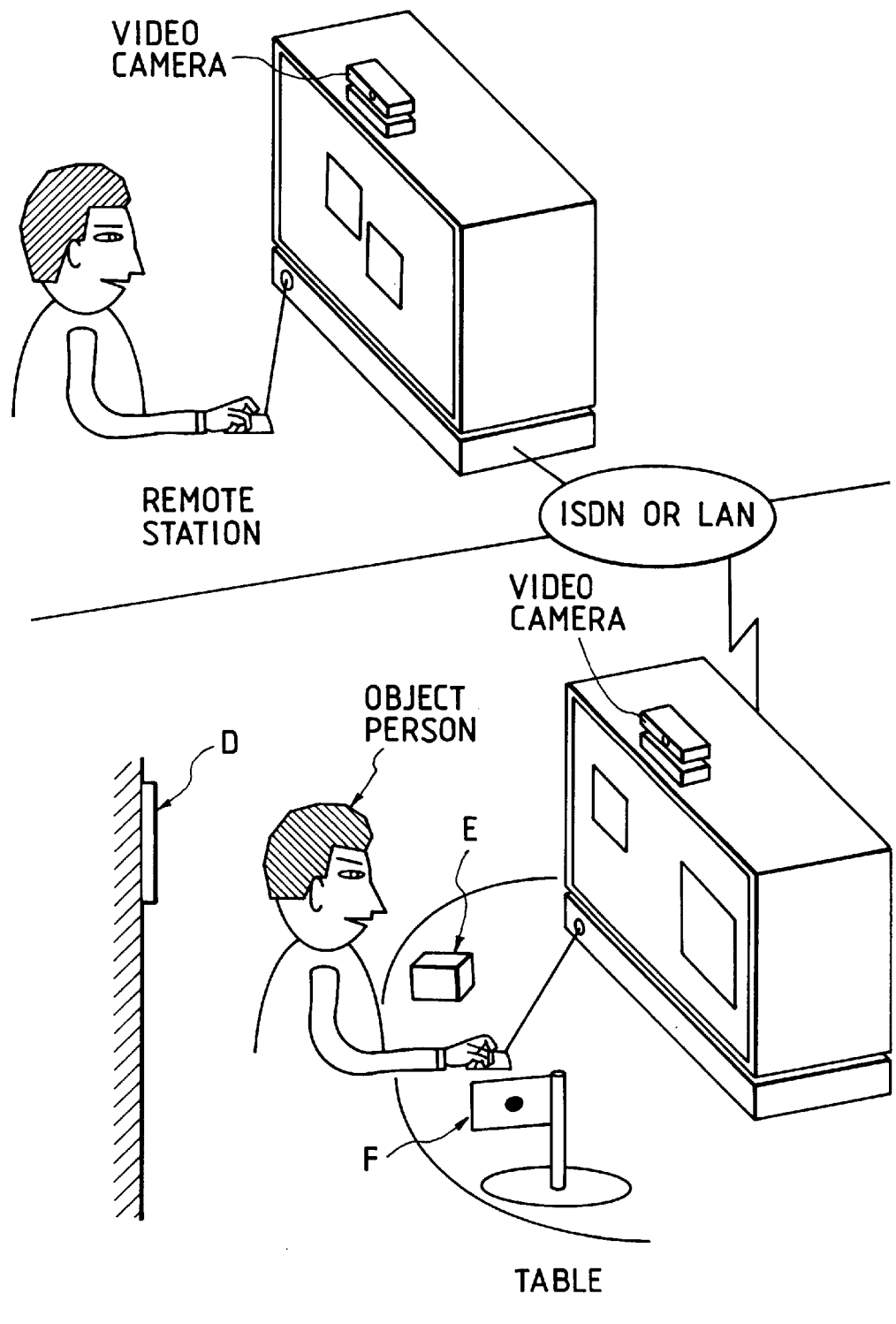
FIG. 27 is a view illustrating a video conference.
Figure 28:
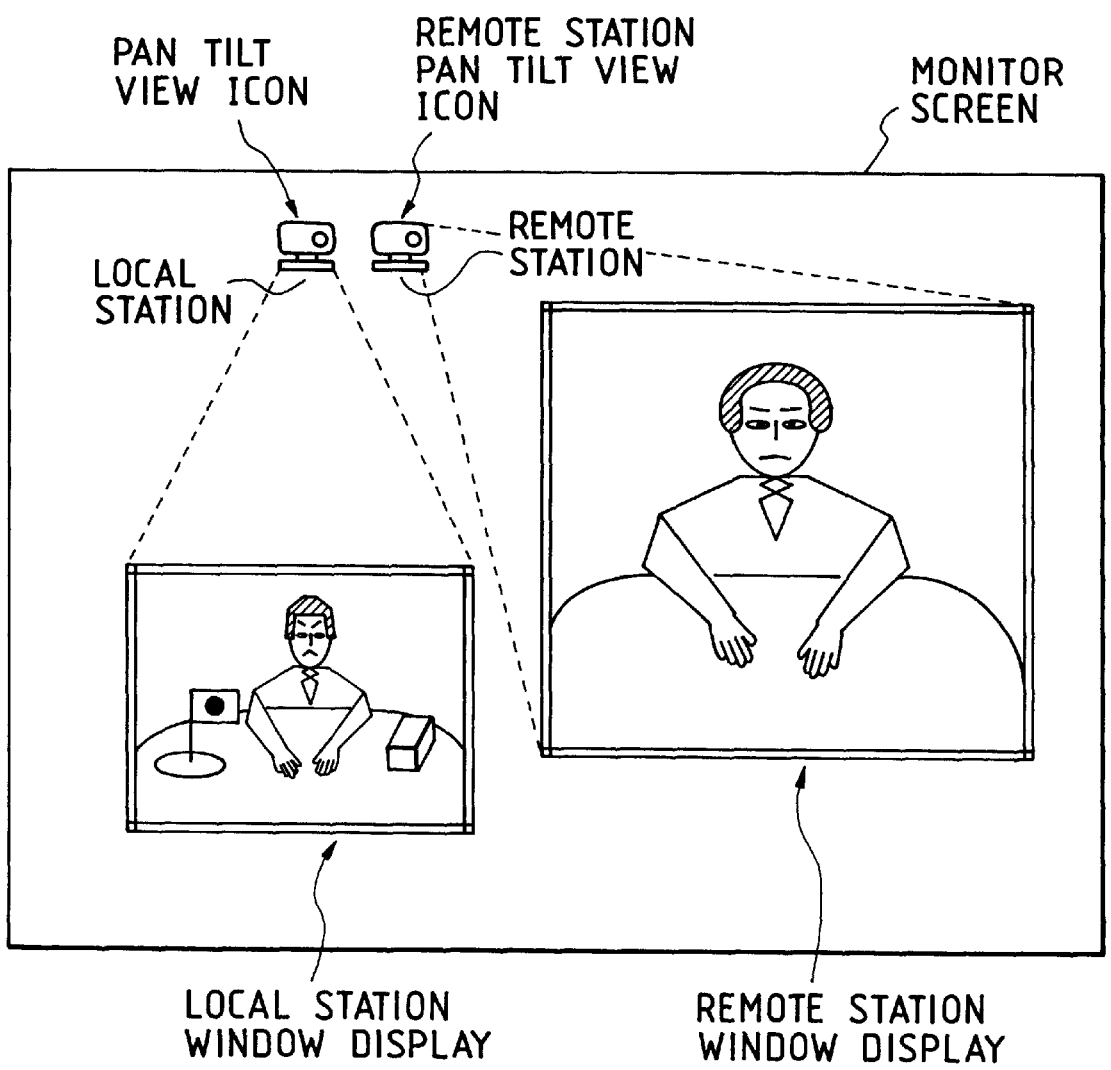
FIG. 28 is a view showing a monitor screen during the video conference.
Figure 29:
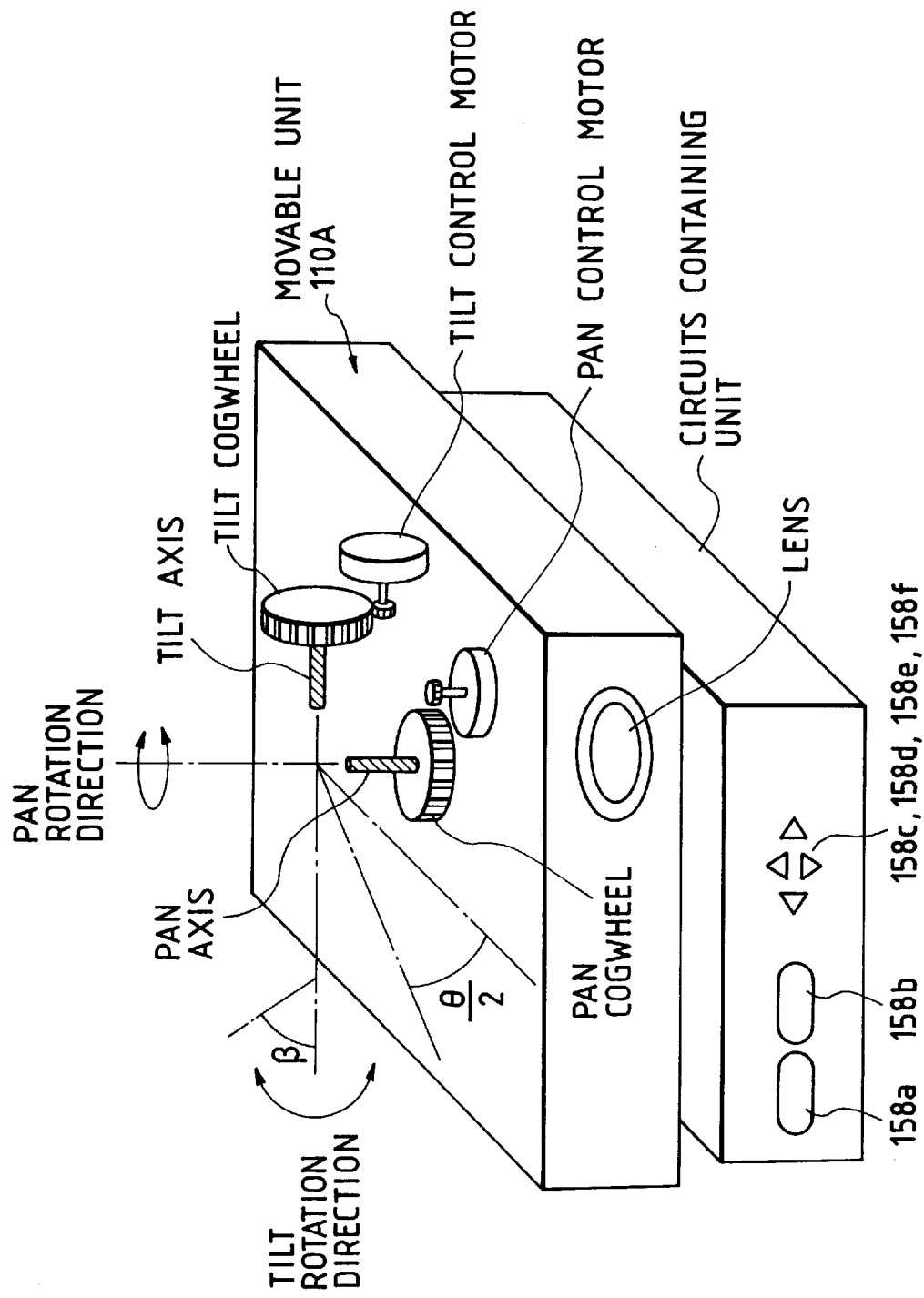
FIG. 29 is a perspective view showing pan and tilt drive systems.
Figure 30:
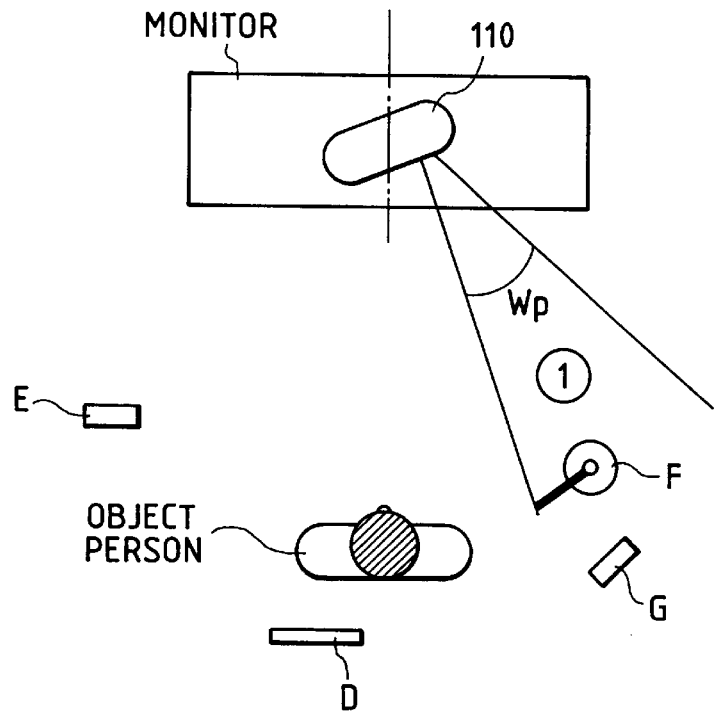
FIG. 30 is a plan view for explaining pan movement.
Figure 31:
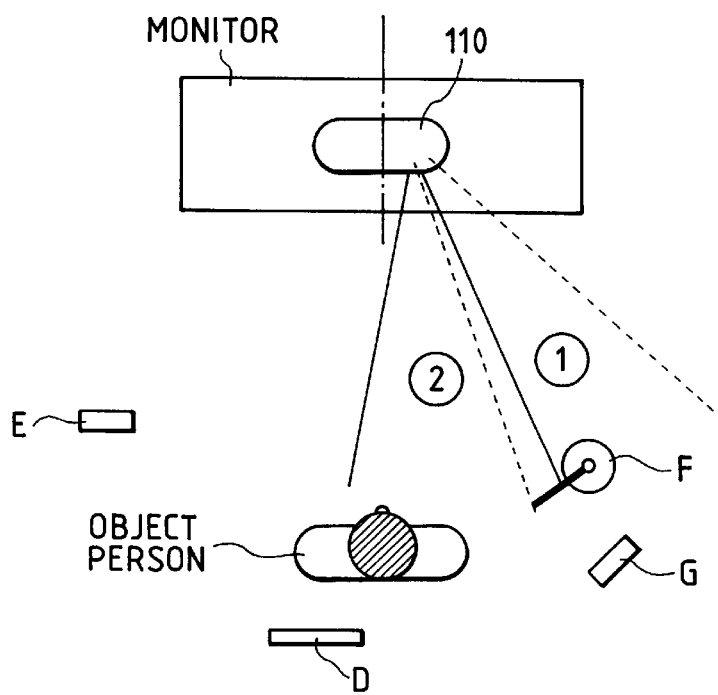
FIG. 31 is a plan view for explaining pan movement.
Figure 32:
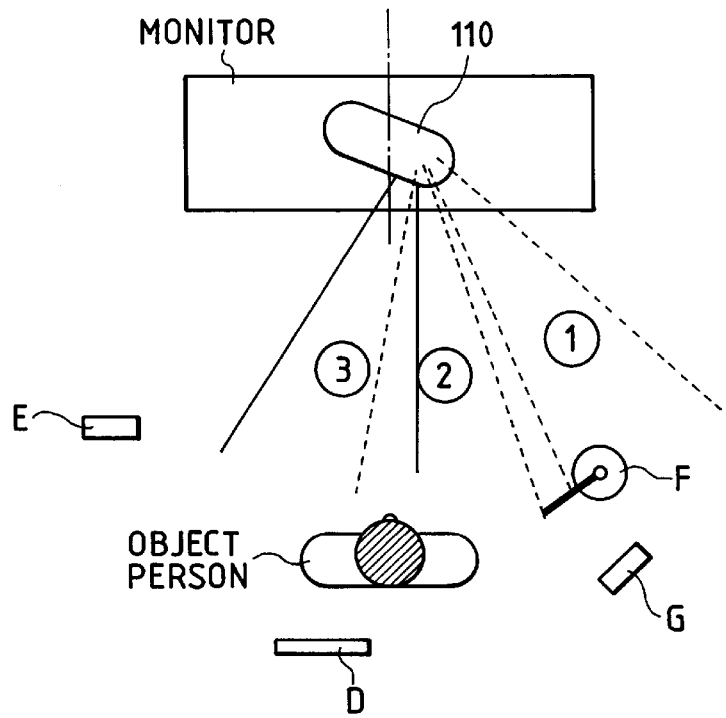
FIG. 32 is a plan view for explaining pan movement.
Figure 33:
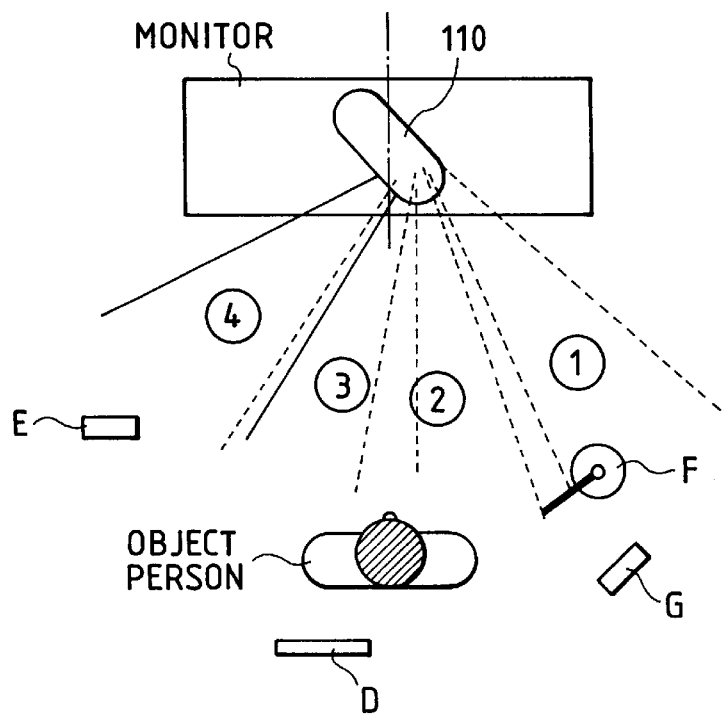
FIG. 33 is a plan view for explaining pan movement.
Figure 34:
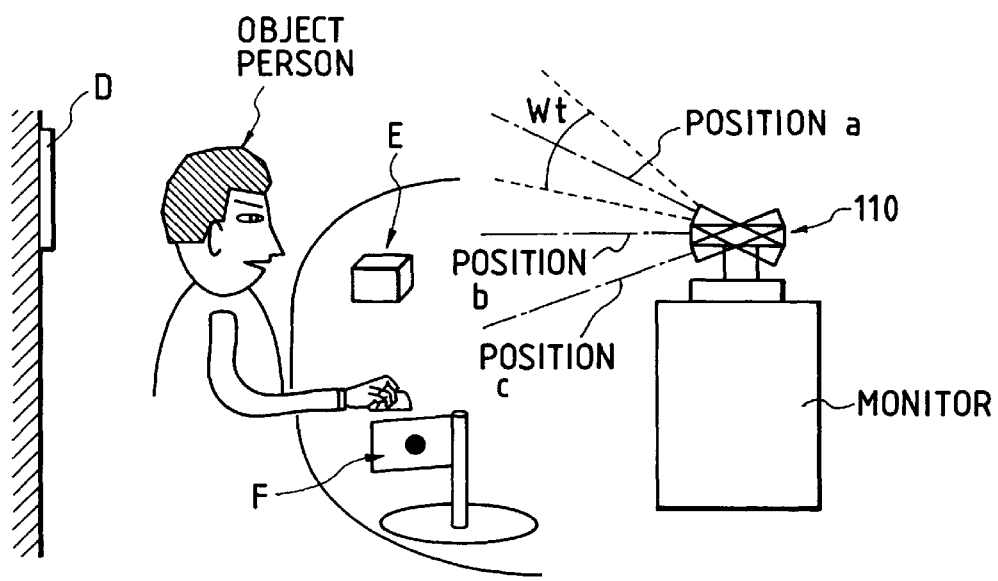
FIG. 34 is a side view for explaining tilt movement.
Figure 35:
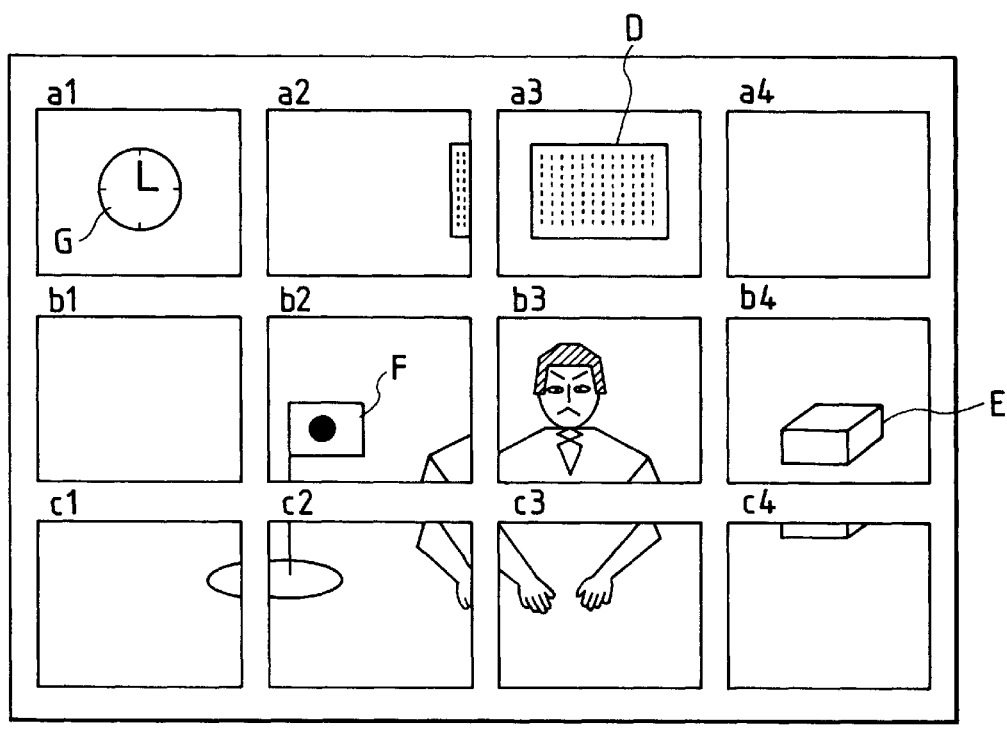
FIG. 35 is a view showing an example of the entire display of all images within a photographing range.

FIG. 27 is a view showing a state wherein a video conference is held using this embodiment, and FIG. 28 shows a display example of the monitor picture. FIG. 29 is a perspective view of the drive device in the camera head movable portion 110A. FIGS. 30, 31, 32, and 33 are plan views showing the photographing angles of view at respective pan positions. In this embodiment, a horizontal photographable range can be covered by four pan operations. FIG. 34 is a side view showing movement of a camera 110 in the tilt direction. FIG. 35 shows a display example of all photographable range picture images.

Figure 36:
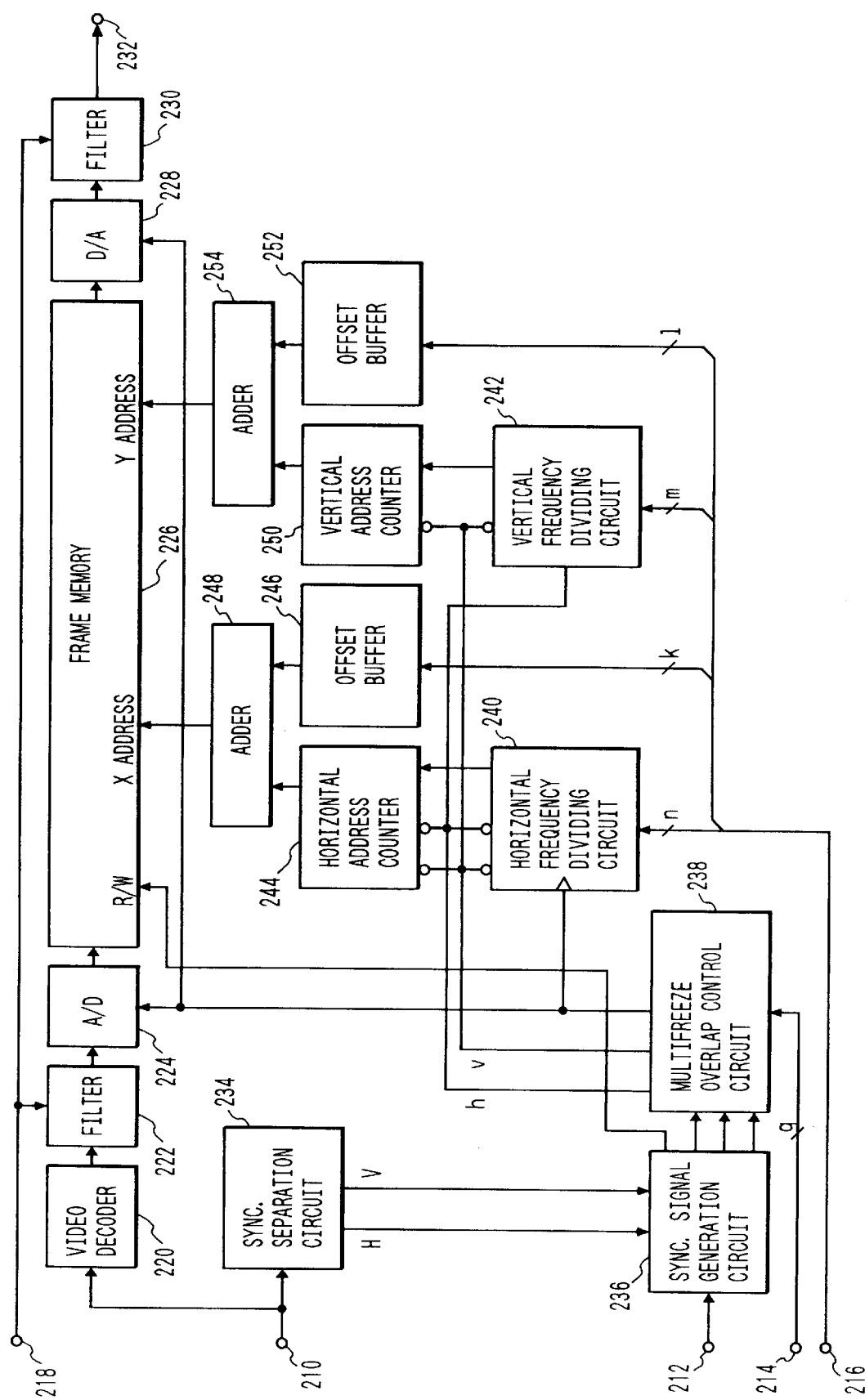
FIG. 36 is a block diagram showing the circuit arrangement of an image storing unit.
Figure 37:
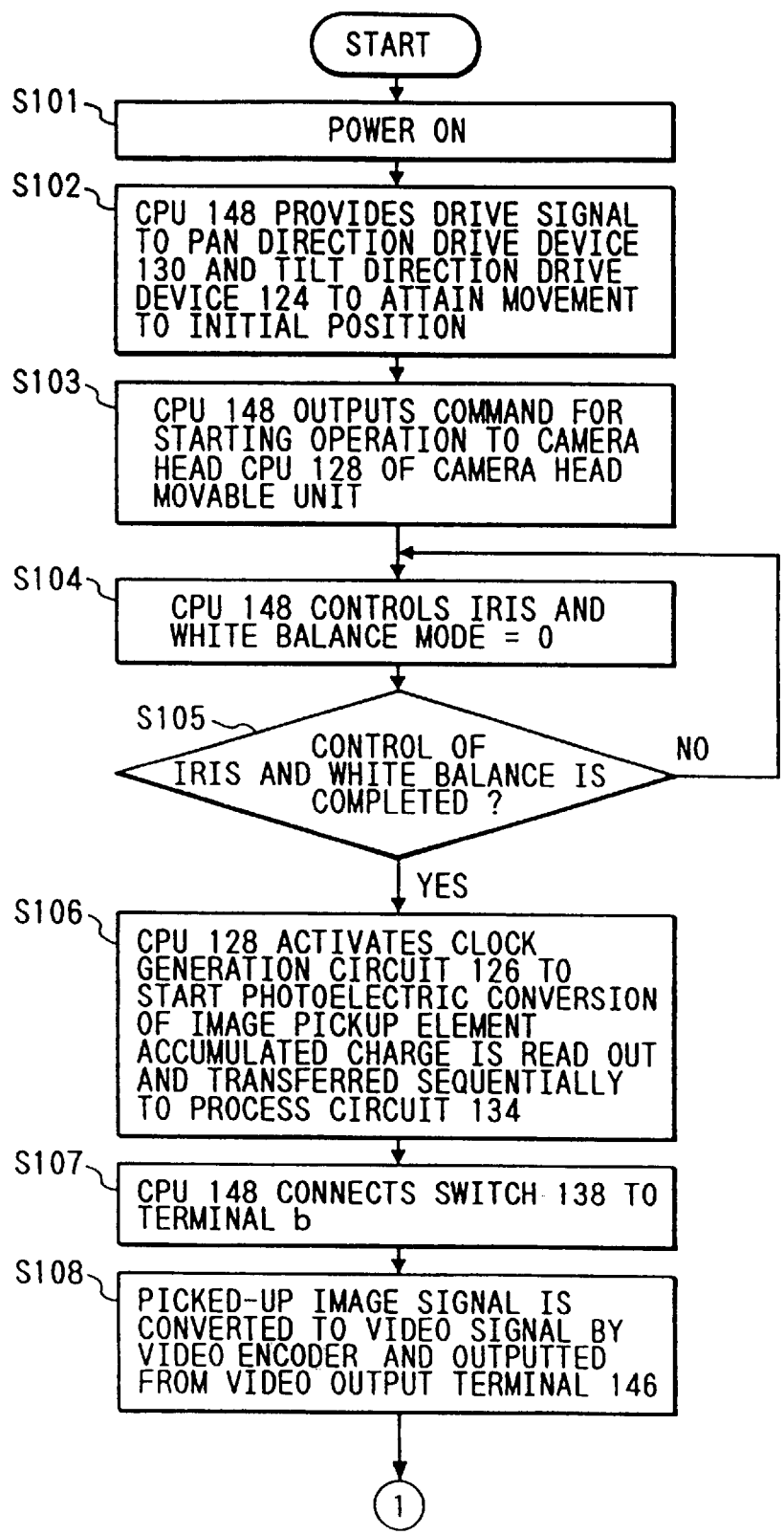
FIG. 37 is a flow chart showing the operation of the fourth embodiment.

FIG. 36 is a diagram showing the internal circuit of the image storing unit 136. The image storing unit 136 comprises an image signal input terminal 210, control signal input terminals 212, 214, 216, and 218, a video decoder 220, a filter 222, an A/D converter 224, a frame memory 226, a D/A converter 228, a filter 230, an image signal output terminal 232, a sync separation circuit 234, a sync signal generation circuit 236, a multifreeze overlap control circuit 238, a horizontal frequency dividing circuit 240, a vertical frequency dividing circuit 242, a horizontal address counter 244, an offset X address buffer 246, an adder 248 for adding an offset from the offset X address buffer 246 to the output address from the horizontal address counter 244, a vertical address counter 250, an offset Y address buffer 252, and an adder 254 for adding an offset from the offset Y address buffer 252 to the output address from the vertical address counter 250.

The operation of this embodiment will be described below with reference to FIGS. 37, 38, 39, 40, 41, and 42. The power switch of the camera 110 is turned on (S101). The CPU 148 sets the tilt and pan direction drive devices 124 and 130 at initial positions via the I/O port 150 and the motor drive circuit 132 (S102). The CPU 148 outputs an operation start command to the camera head CPU 128 in the camera head movable portion 110A (S103).

The camera head CPU 128 controls the iris control circuit 114 and a white balance circuit (not shown) to adjust the exposure amount and white balance in correspondence with an external environment (S104). Upon completion of the iris control and white balance control, the camera head CPU 128 enables the clock generation circuit 126 to cause the image pickup element 120 to start photoelectric conversion. The image pickup element 120 converts an optical image from the zoom lens 112 into electrical signals. The read-out circuit 122 sequentially reads out the electrical signals from the image pickup element 120 in response to the clocks from the clock generation circuit 126, and transfers them to the process circuit 134 (S106). The CPU 148 connects the switch 138 to a terminal b via the I/O port 150 (S107). When the switch 138 is connected to the terminal b, a video signal of an object is output from the video output terminal 146 to an external device (S108).

The CPU 148 checks if the all photographing picture image display switch 158a is depressed (S109). When the switch 158a is continuously depressed for 3 seconds or more (S113), the CPU 148 generates images in a photographable range of the video camera 110 by all photographing picture image formation processing (S114). When the all photographing picture image display switch 158a is released in less than 3 seconds (S113), a flag MODE indicating whether or not an all photographing picture image display mode is set is checked (S115). If the flag MODE is '0', the all photographing picture image display mode is set (S116); if the flag MODE is '0', the all photographing picture image display mode is canceled (S123 and S124).

Figure 43:
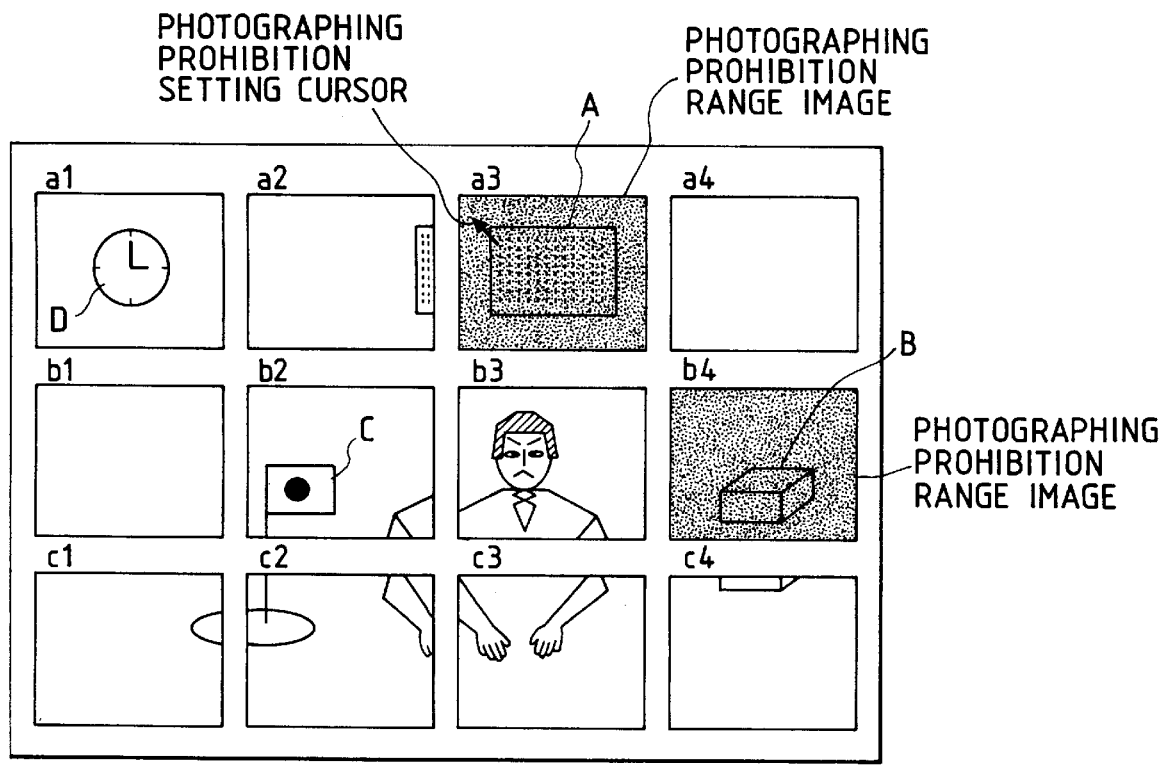
FIG. 43 is a view showing an example of setting of a photographing prohibition image.

Photographing prohibition picture setting processing will be described below. It is checked if images in a photographable range are already stored in the image storing unit 136 (S116). If N (NO) in step S116, the flow returns to step S114; otherwise, the switch 138 is switched to a terminal a side, so that the images stored in the image storing unit 136 are output from the video output terminal 146 (S117). It is checked if one of the move switches 158c, 158d, 158e, and 158f is depressed (S118). If N in step S118, the flow advances to step S120; otherwise, a photographing prohibition setting cursor is displayed, and is moved in the designated direction (S119), as shown in FIG. 43. The photographing prohibition setting cursor is generated by the pointing mark generation circuit 142 in accordance with an instruction from the CPU 148, and the adder 144 superimposes the cursor on a video signal of an image stored in the image storing unit 136.

It is checked if the photographing prohibition setting switch 158b is depressed (S120). If N in step S120, the flow advances to step S122; otherwise, the luminance of the pictures which is set in the photographing prohibition mode is lowered as compared to other pictures free from the photographing prohibition mode, as indicated by gray portions in FIG. 43 (S121). In FIG. 43, objects A and B are set in the photographing prohibition mode. Thus, the photographing prohibition pictures can be confirmed at a glance. In addition, the pan and tilt angles of image freeze positions and zoom magnification information stored in the nonvolatile memory 156 are stored in another area in the nonvolatile memory 156 in correspondence with the photographing prohibition pictures. Thereafter, '1' is set in the mode discrimination flag MODE.

Figure 39:
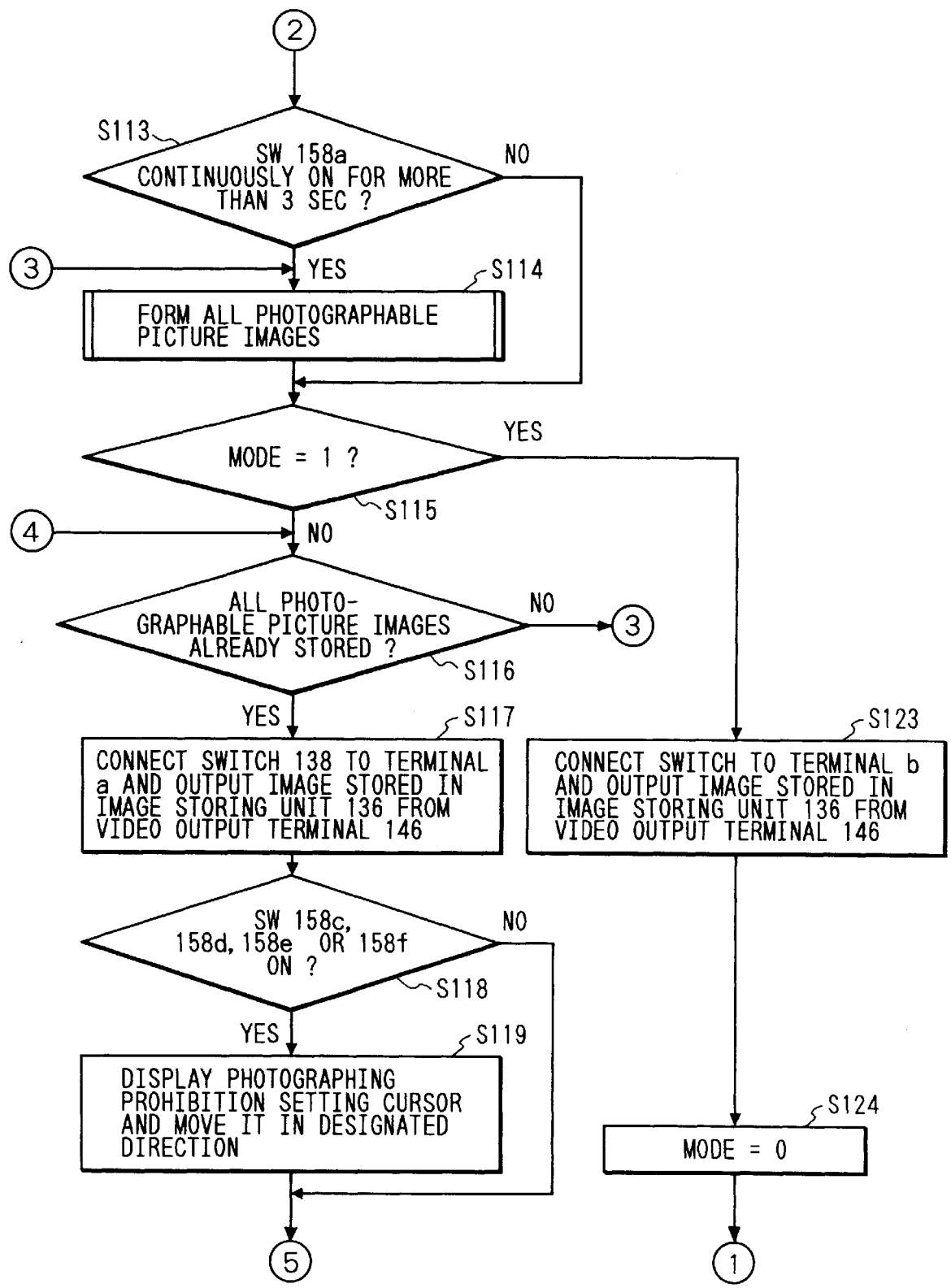
FIG. 39 is a flow chart showing the operation of the fourth embodiment.
Figure 40:
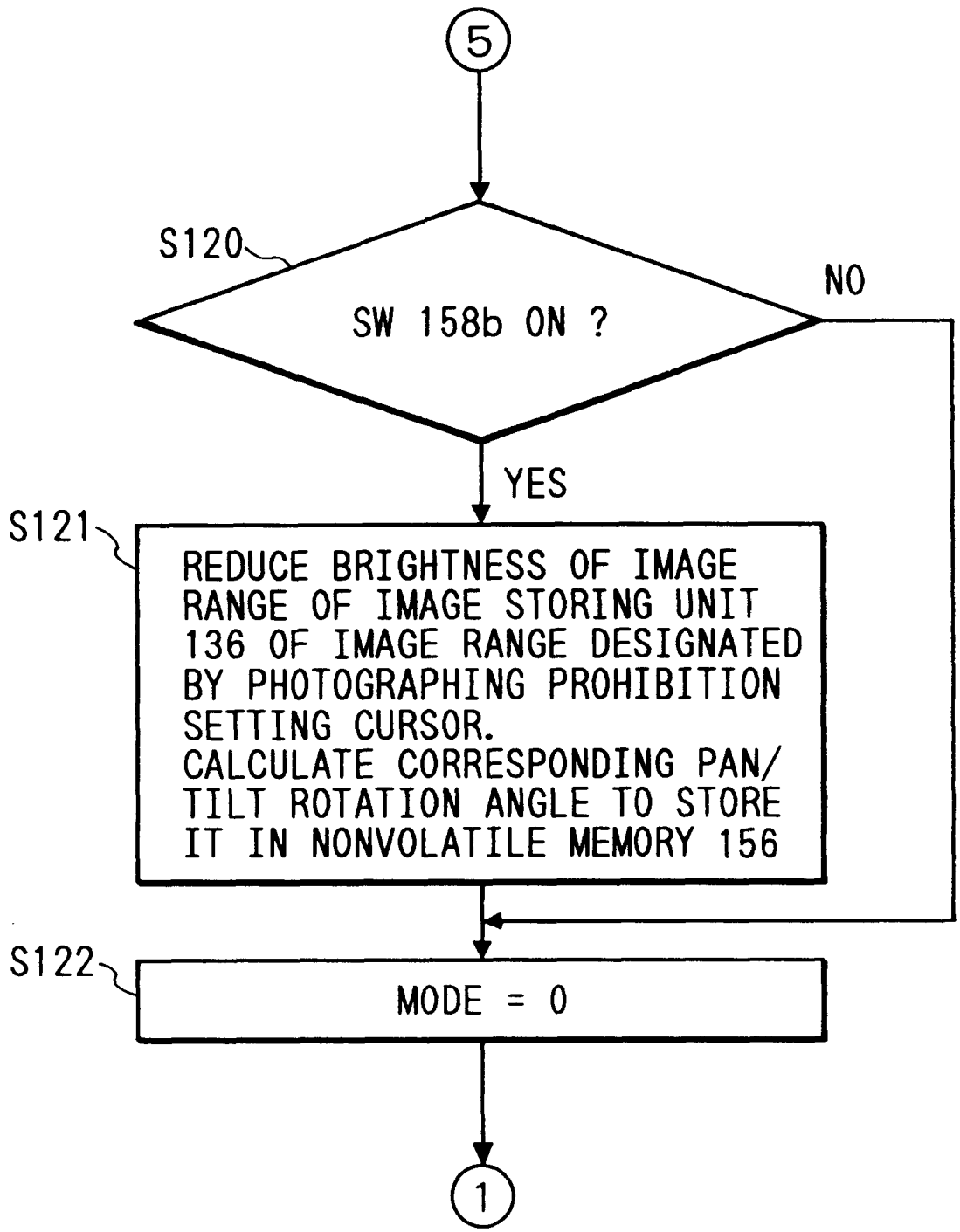
FIG. 40 is a flow chart showing the operation of the fourth embodiment.
Figure 41:
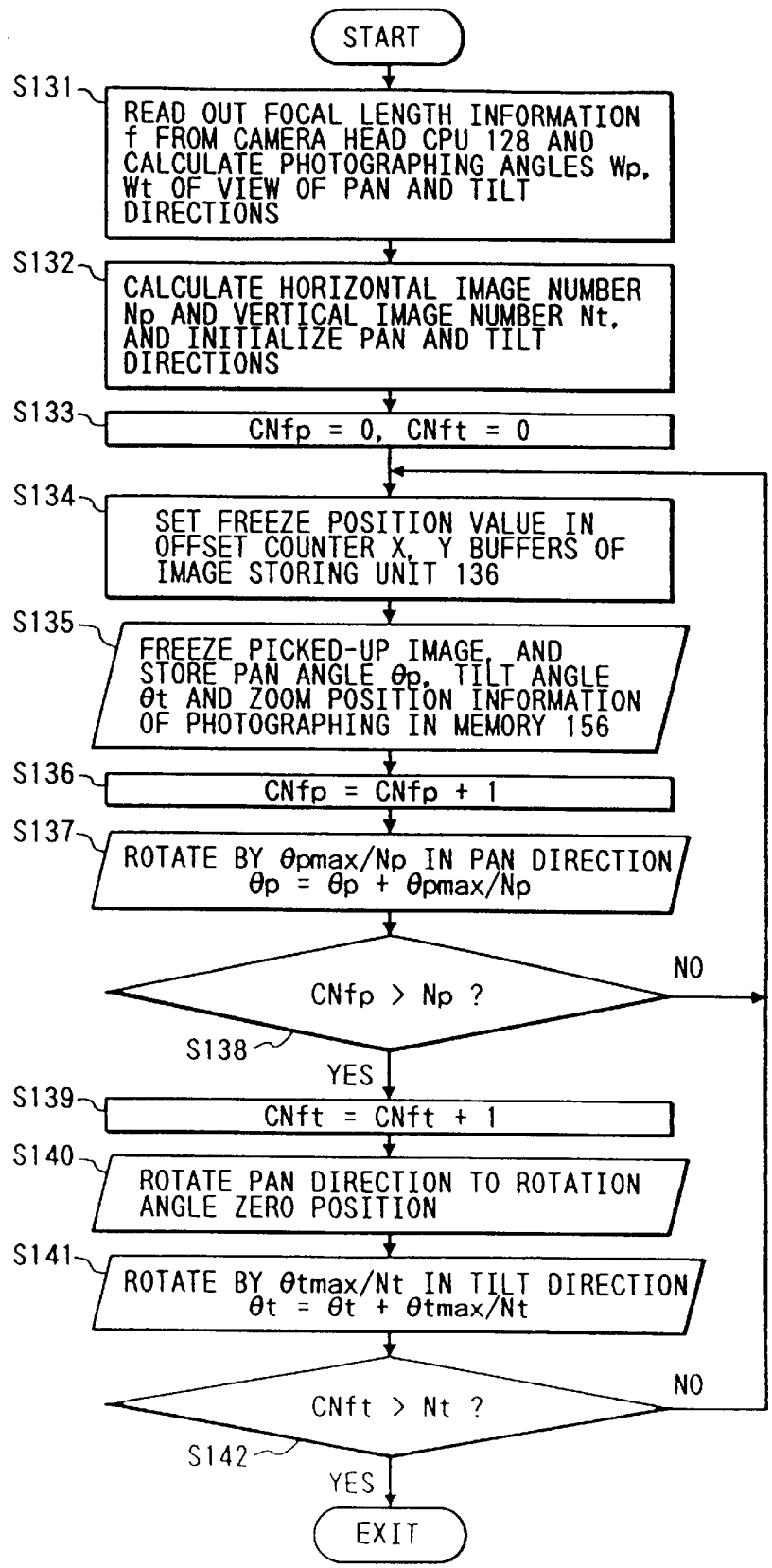
FIG. 41 is a flow chart showing the operation of the fourth embodiment.
Figure 44:
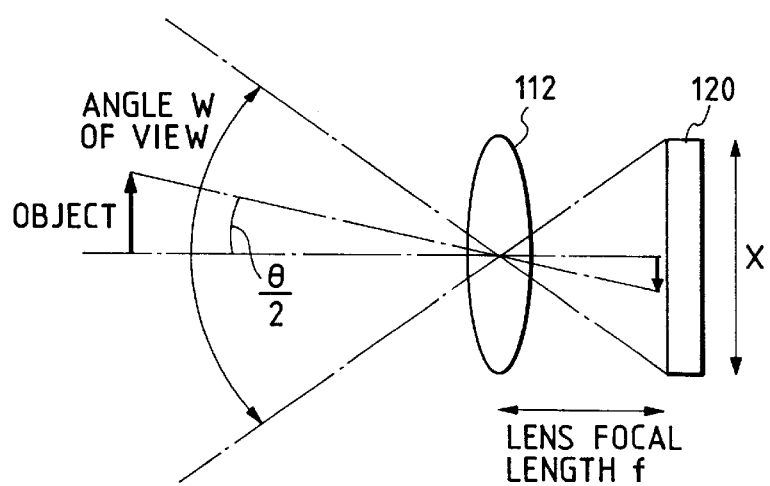
FIG. 44 is a view showing the relationship between the focal length of a lens and the angle of view.

FIG. 41 is a flow chart showing in detail the all photographable picture image formation processing in step S114 in FIG. 39. The CPU 148 fetches control values (focal length information f and zoom magnification) of the focus control circuit 116 and the zoom control circuit 118 from the camera head CPU 128 via the I/O port 150, and calculates horizontal and vertical photographable angles Wp and Wt of view of the image pickup element 120 at that time using the following equations by a method in FIG. 44, which is the same as that in FIG. 7 in the first embodiment (S131).

$$X/2f=\tan(Wp/2) \quad (4)$$

$$Y/2f=\tan(Wt/2) \quad (5)$$

where X is the horizontal effective image size of the image pickup element 120, and Y is the vertical effective image size.

Then, divided image numbers Np and Nt in the pan and tilt directions of multi-pictures in the image storing unit 136 are calculated (S132). If the movable angle, in the pan direction, of the camera 110 is represented by θpmax and the movable angle, in the tilt direction, thereof is represented by θtmax, the numbers Np and Nt are respectively given by:

$$Np=[\theta pmax/Wp] \quad (6)$$

$$Nt=[\theta tmax/Wt] \quad (7)$$

where [X] is an integer equal to or smaller than X+1 and larger than X. If the current position of the pan angle is represented by θp and the current position of the tilt angle is represented by θt, the camera head movable portion 110A is moved and set so as to attain θp=0 and θt=0 (S132). Note that θp=0 corresponds to the state shown in FIG. 30, and θt=0 corresponds to a position a in FIG. 34.

Freeze counters CNfp and CNft in the pan and tilt directions are initialized (S133). That is, $$CNfp=0 \quad (8)$$

$$CNft=0 \quad (9)$$

The value of the freeze position is set in the offset X and Y address buffers 246 and 252 of the image storing unit 136 (S134). The CPU 148 instructs the sync signal generation circuit 236 in the image storing unit 136 via the I/O port 150 to output an image freeze timing signal. The CPU 148 stores the pan angle θp, the tilt angle θt, and the zoom position information in the image freeze state in the nonvolatile memory 156, and utilizes this information in control of the photographing prohibition range in a normal camera control mode (S135).

The pan direction counter CNfp is incremented (S136). An image is rotated by θpmax/Np in the pan direction, and is frozen at a position given by (S137):

$$\theta p=\theta p+\theta pmax/Np \quad (10)$$

The count of the pan direction counter CNfp is compared with the multi-picture image number Np in the pan direction to check if the image freeze operation in the pan direction is completed (S138). If N in step S138, the flow returns to step S134 to repeat step S134 and subsequent steps (see FIGS. 31 and 32).

Upon completion of fetching of an image in the pan direction (see FIG. 33), the tilt direction counter CNft is incremented (S139), and the camera head movable portion 110A is directed to a position of the pan direction angle θp=0 (S140). An image is rotated by θtmax/Nt in the tilt direction (S141). Please refer to a position b in FIG. 34.

The count of the tilt direction counter CNft is compared with the multi-picture image number Nt in the tilt direction to check if the image freeze operation in the tilt direction is completed (S142). If N in step S142, the flow returns to step S134 to repeat step S134 and subsequent steps.

With the above-mentioned operation, all photographable ranges of the camera 110 are photographed in turn to form images of all photographable pictures. FIG. 35 shows an example of all the completed photographable picture images. In this case, four pictures in the horizontal direction and three pictures in the vertical direction are used. However, the present invention is not limited to these numbers of pictures.

Figure 38:
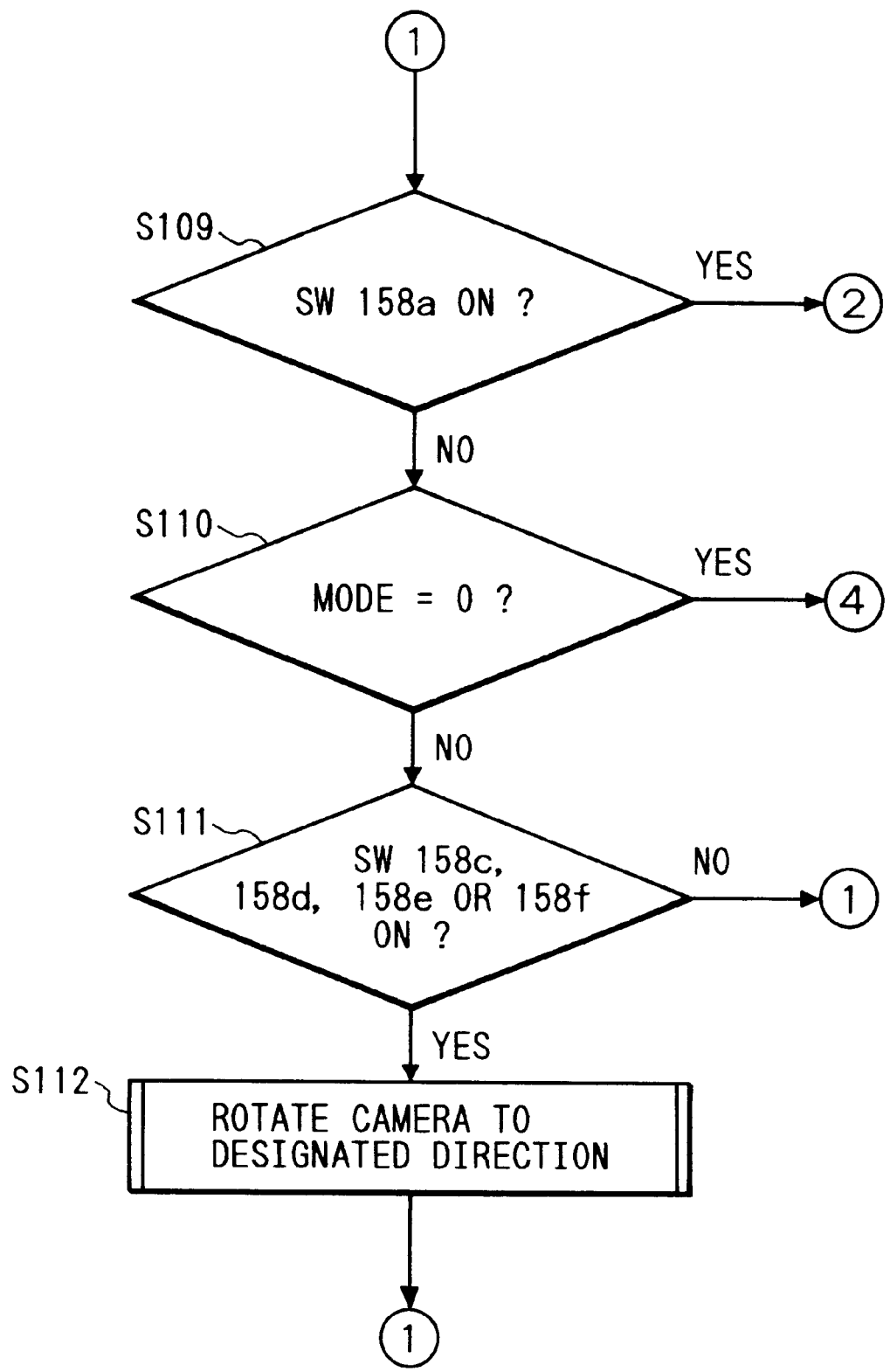
FIG. 38 is a flow chart showing the operation of the fourth embodiment.
Figure 42:
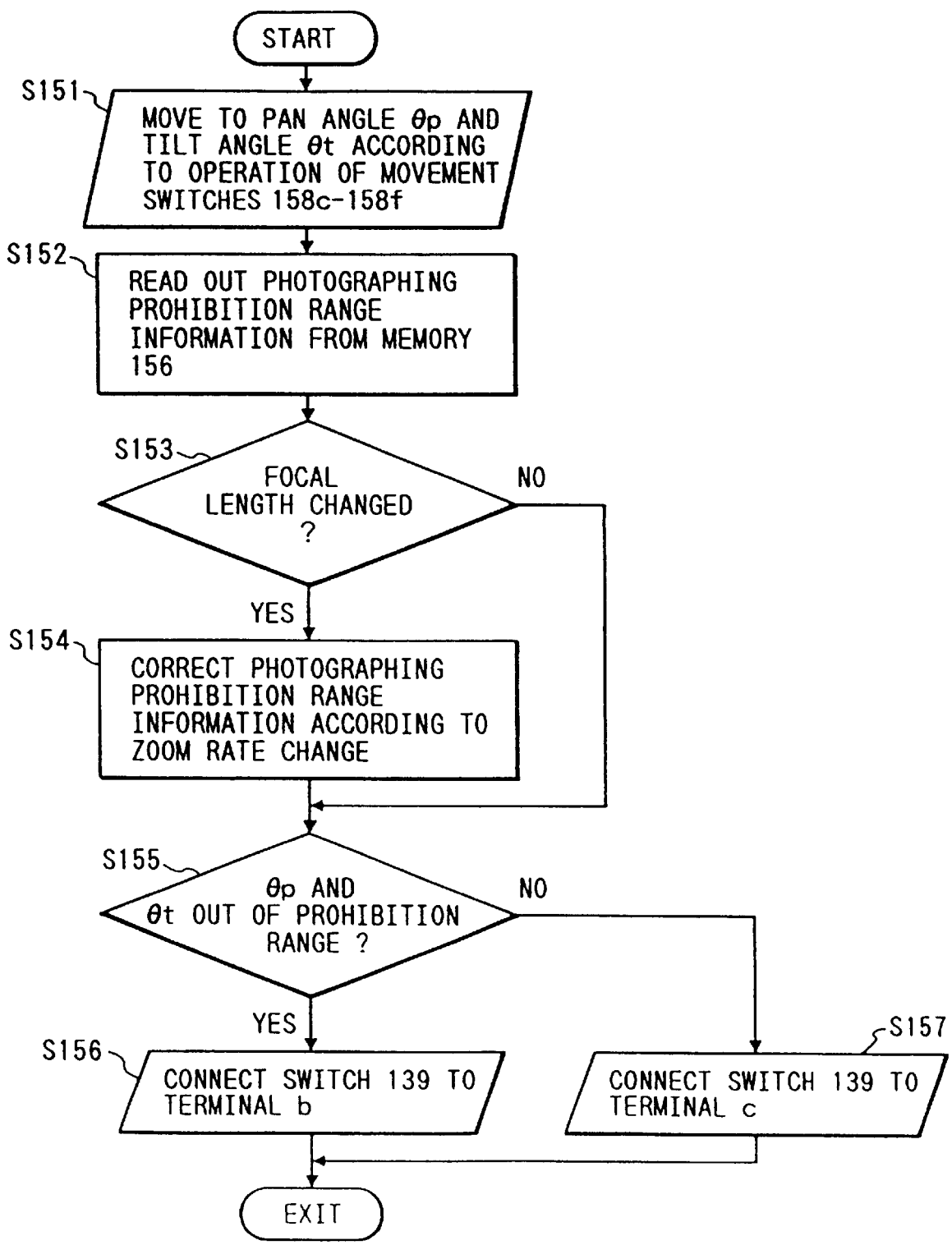
FIG. 42 is a flow chart showing the operation of the fourth embodiment.

FIG. 42 is a flow chart showing in detail the processing in step S112 in FIG. 38. Upon operation of the move switch 158c, 158d, 158e, or 158f (or in response to a similar operation command from an external device), the camera head movable portion 110A is moved in the pan and tilt direction to update the pan angle θp and the tilt angle θt (S151). The photographing prohibition range information is read out from the nonvolatile memory (S152). When the focal length has been changed due to a change in zoom magnification (S153), the photographing prohibition range information read out from the nonvolatile memory 156 is corrected in correspondence with the change in focal length (S154). If the current pan and tilt angles fall outside the photographing prohibition range (S155), a video output operation is permitted; otherwise, the video output operation is prohibited.

Figure 45:
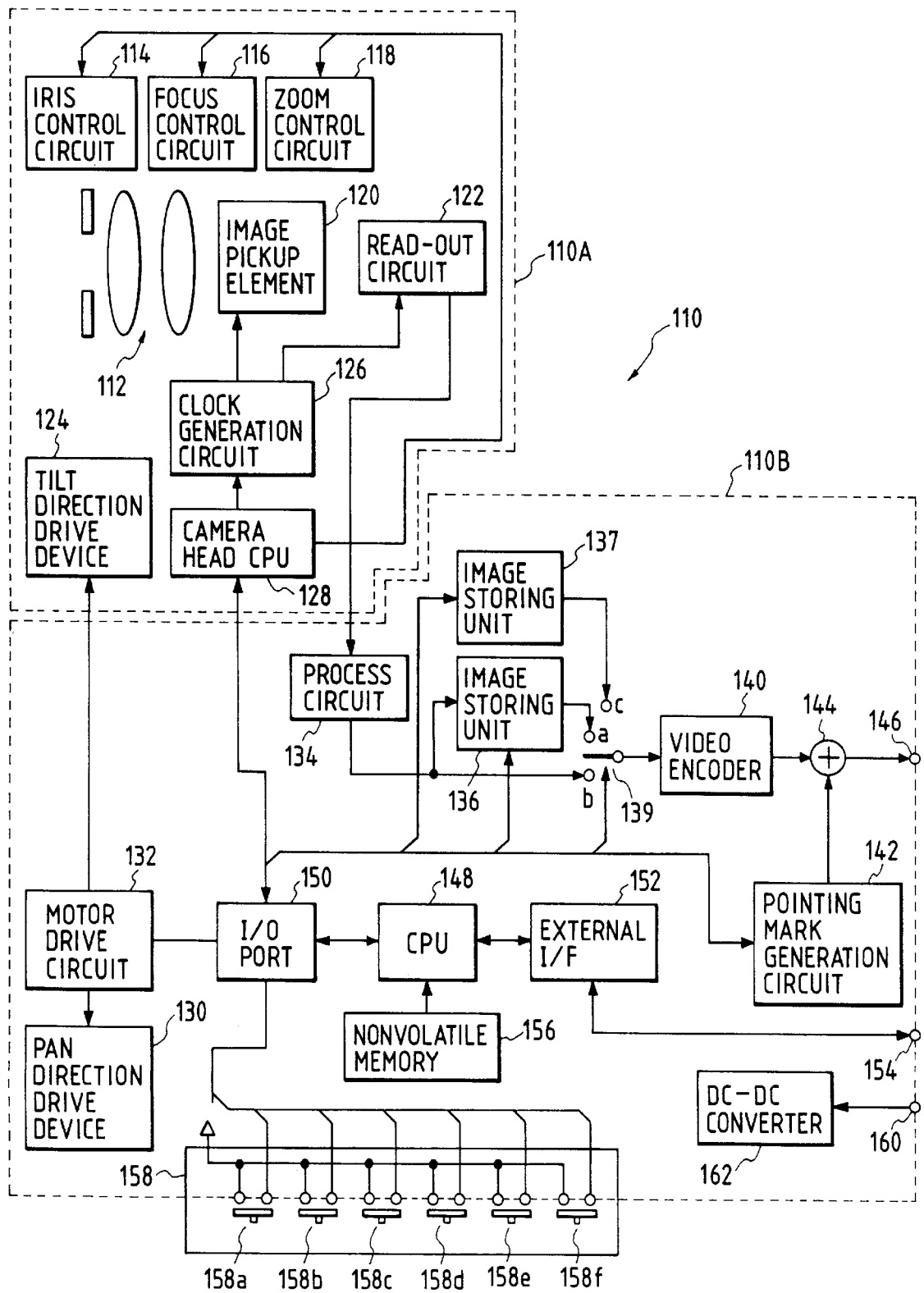
FIG. 45 is a block diagram showing the arrangement according to the fifth embodiment of the present invention.

For example, as shown in FIG. 45, a 3-terminal switch 139 is arranged in place of the switch 138, and the output from an image storing unit 137 for storing a still image is connected to a terminal c of the switch 139. If the current pan and tilt angles fall outside the photographing prohibition range (S155), the switch 139 is connected to a terminal b to video-output a photographed image (S156); otherwise, the switch 139 is connected to the terminal c to video-output a still image stored in the image storing unit 137 (S157).

Figure 46:
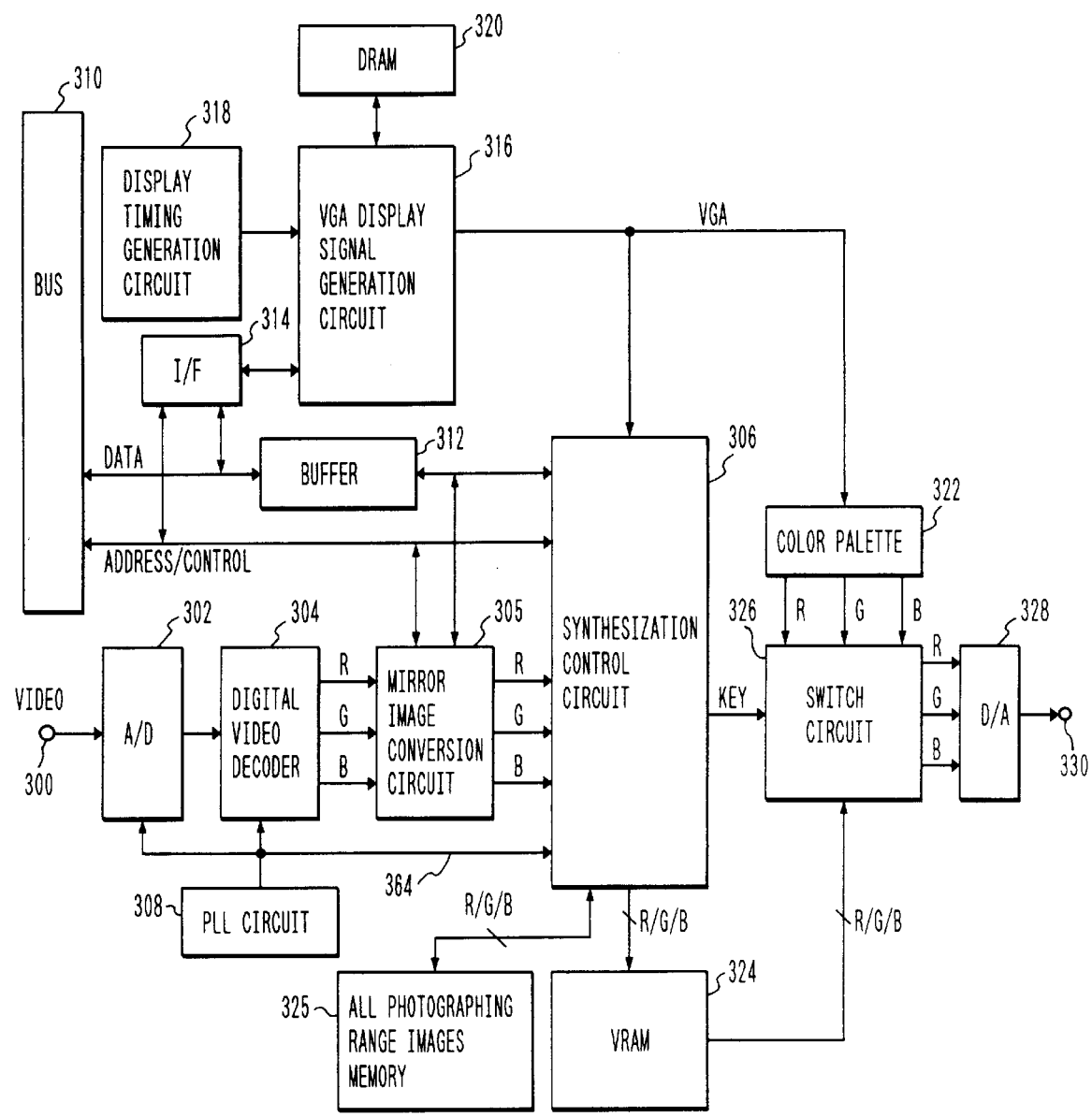
FIG. 46 is a circuit diagram of a video image superimposing circuit having a function of an image storing device.

FIG. 46 shows a video image superimposing circuit connected to the bus of a personal computer or workstation, and this circuit can have a function of the image storing unit 136 shown in FIG. 36. With this circuit, the camera 110 need only have a function of outputting a photographed image.

Referring to FIG. 46, an input terminal 300 receives an analog video signal complying with the NTSC/PAL/SECAM system. An A/D converter 302 converts an analog video signal from the input terminal 300 into a digital signal. A digital video decoder 304 converts the output from the A/D converter 302 into RGB signals, and supplies the RGB signals to a mirror image conversion circuit 305. In accordance with an external control signal, the mirror image conversion circuit 305 supplies the outputs from the decoder 304 to a synthesization control circuit 306 with or without reversal in the horizontal direction. A PLL circuit 308 supplies clocks of a predetermined frequency to the A/D converter 302, the video decoder 304, the mirror image conversion circuit 305, and the synthesization control circuit 306.

Data on a bus 310 of the personal computer or workstation is supplied to the synthesization control circuit 306 via a buffer 312, and address/control signals are directly supplied to the synthesization control circuit 306. Also, the data and address/control signals on the bus 310 are also supplied to a VGA display signal generation circuit 316 via a bus interface 314. The VGA display signal generation circuit 316 generates VGA image data of an image stored in a memory 320 in accordance with a timing signal from a display timing generation circuit 318. The generated image data is supplied to the synthesization control circuit 306 and a color palette 322. The color palette 322 outputs RGB image data in accordance with data from the circuit 316.

The synthesization control circuit 306 writes the RGB data from the video decoder 304 in a video memory 324, and generates a switching control signal of a switch circuit 326 in accordance with the address/control signals form the bus 310. The switch circuit 326 selects the RGB outputs from the color palette 322 or the RGB data from the video memory 324 in accordance with the switching control signal, and outputs selected data to a D/A converter 328. The D/A converter 328 converts digital data into an analog signal. An image signal which is synthesized as described above is supplied to a monitor 132 via an output terminal 330, and is displayed on a picture 134.

In the all photographable picture image formation mode, the synthesization control circuit 306 stores images of video signals input to the input terminal 300 in an all photographing range images memory 325. More specifically, the all photographing range images memory 325 has the same function as the image storing unit 136. When all photographable picture images stored in the all photographing range images memory 325 are to be output, the synthesization control circuit 306 sequentially reads out image data stored in the memory 325, and transfers them to the switch 326 via the VRAM 324. In this manner, the same function as the image storing unit 136 and the switch 138 can be realized by the circuit shown in FIG. 46.

Figure 47:
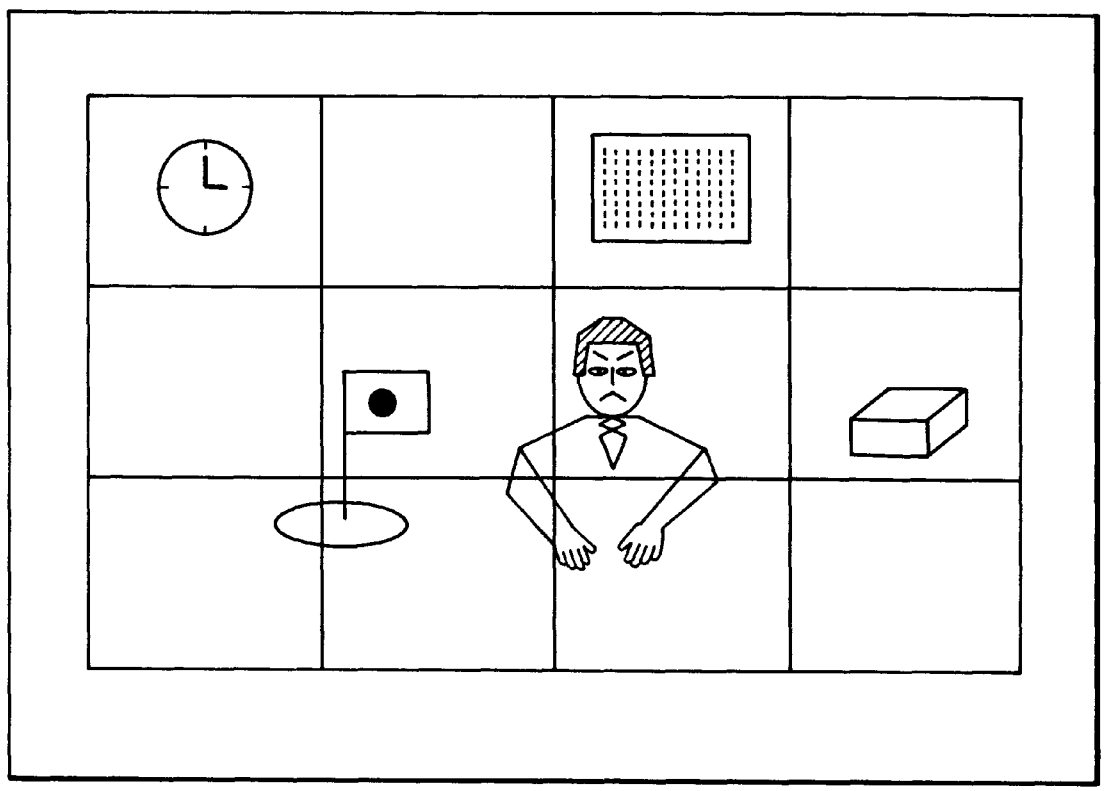
FIG. 47 is a view showing an example of the entire display of photographing range images without boundaries.

In the example shown in FIG. 43, the multifreeze overlap control circuit 238 in FIG. 36 can eliminate boundaries among images. FIG. 47 shows an image without boundaries.

FIG. 48 shows the transmission format of control commands for externally controlling the camera 110. The CPU 148 performs iris, focus, zoom, pan, and tilt control in accordance with the control commands in the format shown in FIG. 48. The control command consists of an identifier (":" in this case), information of an apparatus to be controlled (3 bytes), the kind of operation command (2 bytes), an extension flag, and the like.

The present invention is not limited to the above embodiments, and various changes and modifications may be made within the spirit and scope of the invention. In each of the above embodiments, an image position is designated using a mouse but may be designated using a combination of a digitizer and an input pen. In each of the above embodiments, the moving angle to a target object may be calculated at high speed by a special-purpose circuit.

What is claimed is:

1. A video system for controlling a plurality of image pickup devices each of which receives an optical image, said system comprising:

a receiving device arranged to receive specification information peculiar to an image pickup device which is selected out of said plurality of image pickup devices;

a function display device arranged to detect a function of said image pickup device, from the specification information peculiar to said image pickup device and to display an image of a controller corresponding to the detected function for controlling said image pickup device corresponding to a selection of said image pickup device;

an image pickup control device arranged to control said image pickup device by using the image of the controller displayed by said function display device; and a calculation device arranged to calculate a control value for controlling said image pickup device on the basis of the specification information, in accordance with operating the image of the controller of said image pickup device displayed by said function display device, wherein said image pickup control device outputs a control command for controlling said image pickup device on the basis of the control value calculated by said calculating device.

2. A video system according to claim 1, wherein said image pickup control device changes the image pickup direction in a pan or tilt direction.

3. A video system according to claim 1, wherein an image displayed by said image display device and the image of the controller displayed by said function display device are displayed on the same image display device.

4. A video system according to claim 3, wherein the information comprises information regarding a movable range of said image pickup control device.

5. A video system according to claim 4, further comprising a memory for storing said specification information.

6. A video system according to claim 5, wherein said memory stores specification information in the form of a table.

7. A video system according to claim 3, wherein said image pickup device comprises a zooming device, and the information comprises information regarding a movable range of said zooming device.

8. A video system according to claim 7, further comprising a memory for storing said information.

9. A video system according to claim 8, wherein said memory stores specification information in the form of a table.

10. A video system according to claim 3, wherein said image pickup device comprises an image pickup element, and wherein the specification information comprises a size of an image on said image pickup element.

11. A video system according to claim 10, further comprising a memory for storing said information.

12. A video system according to claim 11, wherein the memory stores said specification information in the form of a table.

13. A video system according to claim 3, wherein said image pickup device comprises an iris, and wherein the information comprises information regarding said iris.

14. A video system according to claim 3, wherein said function display device displays said controller with an icon.

15. A video system according to claim 1, wherein the information comprises information regarding a movable range of said image pickup control device.

16. A video system according to claim 1, wherein said image pickup device comprises a zooming device, and the information comprises information regarding a movable range of said zooming devices.

17. A video system according to claim 1, wherein said image pickup device comprises an image pickup element, and wherein the information comprises information associated with said image pickup element.

18. A video system according to claim 17, wherein the specification information associated with said image pickup element comprises a size of an image on said image pickup element.

19. A video system according to claim 1, wherein said image pickup device comprises an iris, and wherein the information comprises information regarding said iris.

20. A video system according to claim 1, wherein the information comprises information regarding the signal format of the image signal output by said image pickup device.

21. A video system according to claim 1, wherein said image pickup device includes a plurality of different types of video cameras.

22. A video system according to claim 1, further comprising:
- a function display changing device arranged to change display of the controller according to the function information.

23. A video system for controlling an image pickup device which receives an optical image and outputs an image signal and control information different from the image signal, said system comprising:
- a storage device arranged to extract a still image from the image signal picked up at a first angle zoom position by said image pickup device, and for storing a control information, said control information being received from said image pickup device and corresponding to the first angle zoom position;
- an image display device arranged to display the still image stored in said storage device and to display a moving image corresponding to the image signal picked up at a second angle zoom position by said image pickup device, the first angle being wider than the second angle; and
- a control device arranged to control said image pickup device to pick up the moving image at the second angle zoom position, in accordance with a position on the extracted still image designated by a user and the stored control information corresponding to the first angle zoom position.

24. A video system according to claim 23, wherein said storage device stores, when the still image is photographed, a position on the still image displayed by said image display device.

25. A video system according to claim 24, wherein said storage device comprises nonvolatile memories.

26. A video system according to claim 23, wherein the still image displayed by said image display device and the moving image displayed by said moving image display device are displayed on the same image display device.

27. A video system according to claim 26, wherein said image pickup control device changes an image pickup direction of said image pickup device in a pan or tilt direction.

28. A video system according to claim 26, wherein said image pickup device comprises a zooming device, and said control device controls said zooming device.

29. A video system according to claim 23, wherein said image pickup control device changes an image pickup direction of said image pickup device in a pan or tilt direction.

30. A video system according to claim 23, wherein said image pickup device comprises a zooming device, and said control device controls said zooming device.

31. A video system according to claim 23, further comprising:
- a compression device arranged to compress the image signal output from said image pickup device; and
- an expansion device arranged to expand the image signal compressed by said compression device.

32. A video system having an image pickup control device arranged to control an image pickup direction of an image pickup device, to store image signals output from said image pickup device in a memory, and to control said image pickup device to scan a controllable range of the image pickup direction, said video system comprising:
- a control device arranged to display a photographable picture image indicating a controllable range of the image pickup direction on a screen, on the basis of the image signals stored in said memory; and
- a prohibition range setting device arranged to designate a desired image portion on the photographable picture image on said screen, which indicates the controllable range of the image pickup direction, and thereby sets a displaying prohibition range.

33. A video system according to claim 32, wherein an image signal corresponding to a still image is stored in said memory.

34. A video according to claim 32, wherein said control device displays the desired images designated by said prohibition range setting device among the displayed images which indicate the whole controllable range of image pickup direction, in a display manner which is different from that of the displayed images other than the designated images.

35. A method used in a video system, of controlling a plurality of image pick up devices each of which receives an optical image and outputs an image signal and specification information, said method comprising:
- a receiving step of receiving specification information peculiar to an image pickup device which is selected out of said plurality of image pickup devices;
- a function display step of detecting a function of said image pickup device from the specification information peculiar to said image pickup device, and displaying an image of a controller corresponding to the detected function for controlling said image pickup device and changing a display of the detected function corresponding to a selection of said image pickup device;
- a control step of controlling said image pickup device by using the image of the controller displayed in said function display step; and
- a calculation step of calculating a control value for controlling said image pickup device on the basis of the specification information, in accordance with operating the image of the controller of said image pickup device displayed in said function display step,
- wherein said control step outputs a control command for controlling said image pickup device on the basis of the control value calculated in said calculating step.

36. A method used in a video system, of controlling an image pickup device which receives an optical image and outputs an image signal and control information different from the image signal, said method comprising the steps of:
- a storing step of extracting a still image from the image signal picked up at a first angle zoom position by said image pickup device, and of storing a control information, said control information being received from said image pickup device and corresponding to the first angle zoom position;
- an image display step of displaying the still image stored in said storing step and displaying a moving image corresponding to the image signal picked up at a second angle zoom position by said image pickup device, the first angle being wider than the second angle; and a control step of controlling said image pickup device to pick up the moving image at the second angle zoom position in accordance with the position on the extracted still image designated by a user and the stored control information corresponding to the first angle zoom position.

37. A method used in a video system having an image pickup control device arranged to control an image pickup direction of the image pickup device, to store image signals output from said image pick up device in a memory, and to control said image pickup device to scan a controllable range of the image pickup direction, said method comprising the steps of:

a display step of displaying a photographable picture image indicating a controllable range of the image pickup direction on a screen, on the basis of the image signals stored in said memory; and a prohibition range setting step of designating a desired image portion on the photographable picture image on said screen, which indicates the controllable range of image pickup direction, and thereby setting a displaying prohibition range.

38. A video system for controlling a plurality of image pickup devices each of which receives an optical image, said system comprising:

a receiving device arranged to receive specification information peculiar to an image pickup device which is selected out of said plurality of image pickup devices;

a function display device arranged to display an image of a controller corresponding to a function of said image pickup device;

a calculation device arranged to calculate a control value for controlling said image pickup device on the basis of the specification information received by said receiving device, in accordance with operating the image of the controller of said image pickup device displayed by said function display device; and an output device arranged to output a control command for controlling said image pickup device on the basis of the control value calculated by said calculating device.

39. A system according to claim 38, wherein the specification information is information of a movable range of an image pickup direction of said image pickup device.

40. A system according to claim 38, wherein the specification information is information of a movable range of a zooming device of said image pickup device.

41. A system according to claim 38, wherein the specification information is information of a size of an image pickup element of said image pickup device.

42. A system according to claim 38, wherein the image of the controller of said image pickup device is displayed as a cursor on a screen, and wherein said calculation device calculates the control value based on the specification information according to a position at which the cursor is operated.

43. A method used in a video system, of controlling a plurality of image pickup devices each of which receives an optical image, said method comprising the steps of:

a receiving step of receiving specification information peculiar to an image pickup device which is selected out of said plurality of image pickup devices;

a function display step of displaying an image of a controller corresponding to a function of said image pickup device;

a calculating step of calculating a control value for controlling said image pickup device on the basis of the specification information received in said receiving step, in accordance with operating the image of the controller of said image pickup device displayed in said function display step; and an output step of outputting a control command for controlling said image pickup device on the basis of the control value calculated in said calculating step.

44. A method according to claim 43, wherein the specification information is information of a movable range of an image pickup direction of said image pickup device.

45. A method according to claim 43, wherein the specification information is information of a movable range of a zooming device of said image pickup device.

46. A method according to claim 43, wherein the specification information is information of a size of an image pickup element of said image pickup device.

47. A method according to claim 43, wherein the image of the controller of said image pickup device is displayed as a cursor on a screen, and wherein said calculation step indicates a step of calculating the control value based on the specification information according to a position at which the cursor is operated.

48. A video system having an image pickup control device arranged to control an image pickup direction of an image pickup device, and to control said image pickup device to scan a viewable range of said image pickup device and store a photographable image indicating a controllable range of the image pickup direction in a memory, said video system comprising:

a control device arranged to display on a screen the photographable image indicating the controllable range of the image pickup direction stored in said memory and;

a restriction range setting device arranged to designate a desired image portion on the photographable image which indicates the controllable range, to set a display restriction range.

49. The video system according to claim 48, wherein output of an image from the image pickup device is restricted in a case where the image pickup direction of the image pickup device is in the designated portion.

50. A control method for an image pickup control device arranged to control an image pickup direction of an image pickup device and to control said image pickup device to scan a viewable range of said image pickup device and store a photographable image indicating a controllable range of the image pickup direction in a memory, said method comprising the steps of;

displaying on a screen the photographable image indicating the controllable range of the image pickup direction stored in said memory; and designating a desired image portion on the photographable image which indicates the controllable range, to set a display restriction range.

51. The method according to claim 50, wherein output of an image from the image pickup device is restricted in a case where the image pickup direction of the image pickup device is in the designated portion.

* * * * *

UNITED STATES PATENT AND TRADEMARK OFFICE
CERTIFICATE OF CORRECTION

Figure 13:
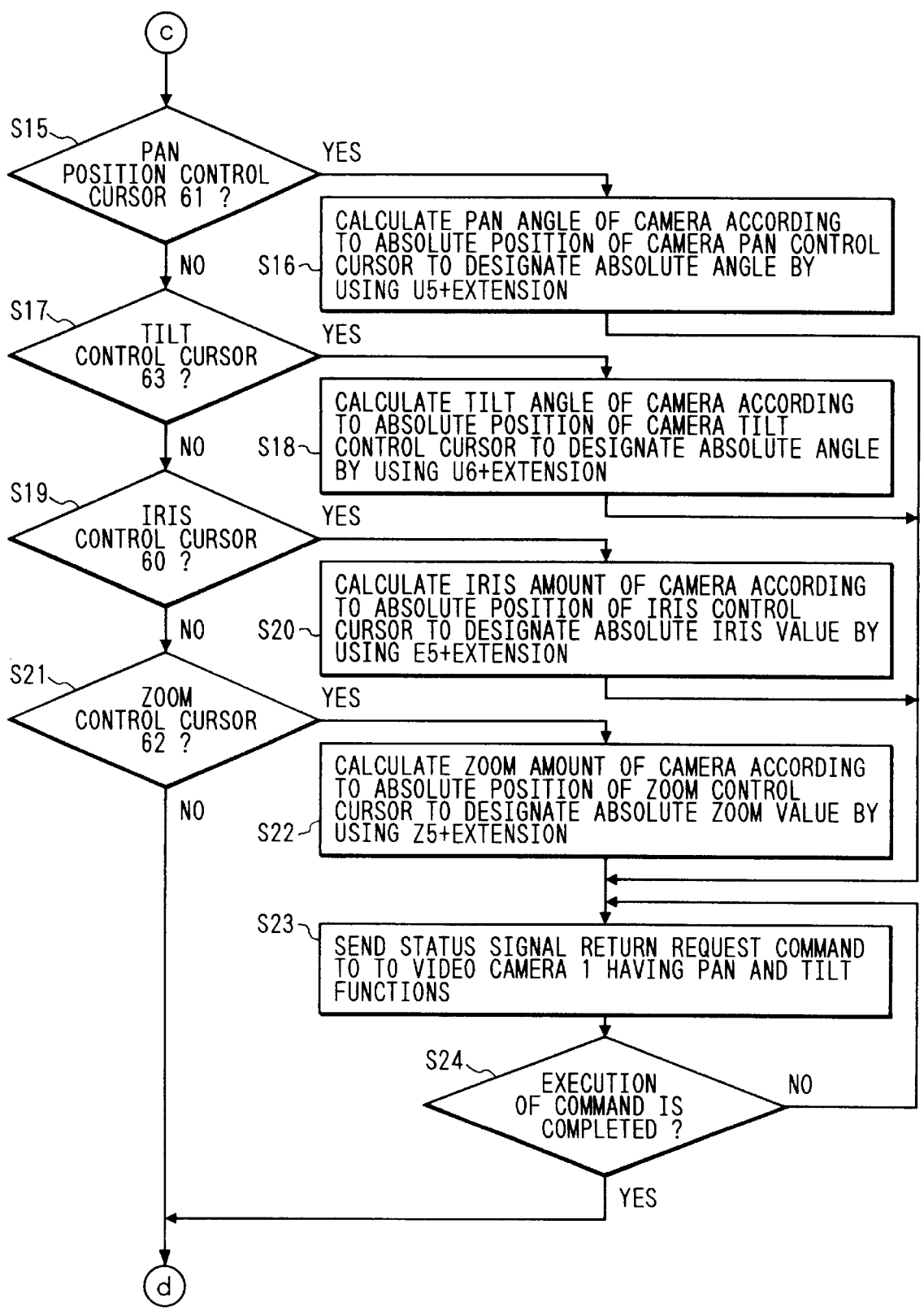
FIG. 13 is a flow chart showing the control sequence of the first embodiment.

PATENT NO. : 6,665,006 B1
DATED : December 16, 2003
INVENTOR(S) : Tomishige Taguchi It is certified that error appears in the above-identified patent and that said Letters Patent is hereby corrected as shown below:

Drawings,
Sheet 12, Figure 13, "TO TO" should read -- TO --.
Sheet 20, Figure 21, "WITH BY" should read -- BY--.
Sheet 22, Figure 23, "TO TO" should read -- TO --.

Column 7,
Line 51, "angle $\phi$" should read -- angle $\theta$ --.

Column 15,
Line 11, "portion" should read -- portion 110A. --.

Column 17,
Line 33, "epmax" should read -- $\theta$pmax --.

Column 18,
Line 31, "direction" should read -- directions --.

Column 19,
Line 20, "form" should read -- from --.

Column 20,
Lines 32 and 41, "specification" should read -- said specification --.

Column 22,
Line 21, "video" should read -- video system --.
Line 28, "pick up" should read -- pickup --.

Column 23,
Line 10, "pick up" should read -- pickup --.

UNITED STATES PATENT AND TRADEMARK OFFICE
CERTIFICATE OF CORRECTION

PATENT NO. : 6,665,006 B1
DATED : December 16, 2003
INVENTOR(S) : Tomishige Taguchi It is certified that error appears in the above-identified patent and that said Letters Patent is hereby corrected as shown below:

<u>Column 24,</u>
Line 53, "of;" should read -- of: --.

Signed and Sealed this

Twenty-ninth Day of June, 2004

JON W. DUDAS
*Acting Director of the United States Patent and Trademark Office*